(12) United States Patent (10) Patent No.: US 8,560,683 B2
Funk et al. (45) Date of Patent: Oct. 15, 2013

(54) VIDEO AND SITE ANALYTICS

(75) Inventors: Gregory Allan Funk, San Francisco, CA (US); Vincent Gatto, Jr., San Francisco, CA (US); Nareshkumar Rajkumar, San Jose, CA (US); Theodore Kent Hamilton, Rüschlikon (CH)

(73) Assignee: Google Inc., Mountain View, CA (US)

( * ) Notice: Subject to any disclaimer, the term of this patent is extended or adjusted under 35 U.S.C. 154(b) by 132 days.

(21) Appl. No.: 13/158,313

(22) Filed: Jun. 10, 2011

(65) Prior Publication Data

US 2012/0317271 A1 Dec. 13, 2012

(51) Int. Cl.
*G06F 15/16* (2006.01)
*G06F 15/173* (2006.01)

(52) U.S. Cl.
USPC ............................................ 709/224; 709/203

(58) Field of Classification Search
USPC .......................................... 709/203, 223–224
See application file for complete search history.

(56) References Cited

U.S. PATENT DOCUMENTS

| | | | |
|---|---|---|---|
| 2007/0250618 A1* | 10/2007 | Hammond | 709/224 |
| 2008/0005793 A1* | 1/2008 | Wenig et al. | 726/22 |
| 2008/0275982 A1* | 11/2008 | Busch et al. | 709/224 |
| 2009/0112918 A1 | 4/2009 | Terrell | |
| 2009/0157898 A1* | 6/2009 | Nandy et al. | 709/232 |
| 2010/0138437 A1 | 6/2010 | Nadig et al. | |
| 2010/0146110 A1* | 6/2010 | Christensen et al. | 709/224 |
| 2011/0040623 A1 | 2/2011 | Lauwers et al. | |
| 2011/0087754 A1 | 4/2011 | Cansino et al. | |
| 2011/0225608 A1* | 9/2011 | Lopatecki et al. | 725/34 |
| 2011/0307580 A1* | 12/2011 | Fullett | 709/219 |
| 2012/0215846 A1* | 8/2012 | Howes et al. | 709/204 |

OTHER PUBLICATIONS

International Search Report and Written Opinion for PCT/US2012/041682, dated Aug. 3, 2012, 16 pages.
Altnet, Internet, retrieved at, http://www.globalfileregistry.com/assets/Global_File_Registry_White_Paper.pdf, May 26, 2006, 20 pages.

* cited by examiner

*Primary Examiner* — Joshua Joo
(74) *Attorney, Agent, or Firm* — Lowenstein Sandler LLP

(57) ABSTRACT

Analytics describing video data published to one or more destination sites are calculated. Metrics describing performance of the video data, such as performance in different geographical areas, in different demographics and in different devices are calculated. An interface simplifies calculation of the video metrics to simplify analysis by allowing a user to identify different videos or sets of videos for analysis. Additionally, interaction with one or more web pages including the video data is also captured and combined with video data performance metrics. Integrating web page interaction data and video performance metrics provide a user with a more accurate description of how visitors interact with content presented using the one or more web pages.

21 Claims, 11 Drawing Sheets

| Video Overview |||||
|---|---|---|---|---|
| Name | Player Loads | Views | Unique Views | Minutes Watched |
| Video Set 1 | 500,000 | 100,000 | 60,780 | 40,000 |
| Video Set 2 | 2100 | 2000 | 1000 | 100,000 |
| Test | 50 | 12 | 12 | 300 |
|  |  |  |  |  |

VIDEO AND SITE ANALYTICS

BACKGROUND

1. Technical Field

The present disclosure generally relates to website usage analysis and, more specifically, the capture and analysis of website usage data and interaction with video data presented by the website.

2. Background

Entities that publish content, such as video data, to one or more websites typically desire analytic data about the published content. For example, if video data is published to one or more websites, the publishers may seek information about the number of times the video data is viewed, if the video data is functioning as an advertisement, the number of users watching the video data or other metrics describing performance of the video data. Such video data metrics may allow a publisher to identify problems with the video data or with the web sites used to present the video data, allowing the publisher to modify the video data or where the video data is presented to increase user interaction with the video data. With video data becoming an increasingly larger portion of Internet traffic, metrics describing video data allow publishers to more effectively disseminate video data.

Because users view video data in the context of viewing a page included in the website, publishers also have concern over the website and/or web page where video data is viewed. Because of the relationship between video data and website or web pages, if a publisher views only video data metrics, the publisher would have an incomplete understanding of user activity and user experience with the website. Similarly, viewing data describing only user interaction with web pages within a web site does not account for user interaction with video data included in the web site.

Additionally, viewing of video content influences user interaction with web pages, so it is beneficial for publishers to understand the effect video data has on user interaction with web pages within a website. For example, data describing whether users stay on a website longer when viewing particular video data allows a publisher to determine whether certain video data prompts a user to continue accessing web pages within a website or causes users to exit the website after viewing the video data. Combining video data metrics with web site interaction allows a publisher to publish video data that accounts for how video data affects user interaction with a website.

SUMMARY

Embodiments disclosed herein provide a system and method for capturing and analyzing interactions with video data and interactions with web pages used to present the video data. A user device loads a web page from a website. The web page includes a media player for presenting video data and receiving an interaction with the web page. The user device also receives an interaction with the web page. An analytics engine is configured to communication with the user device and receives media player state information from the media player. The media player state information describes the interaction with the video data and includes a session identifier. Additionally, the analytics engine receives web analytics data describing the interaction with the web page and the session identifier. The analytics engine associates the media player state information with the web analytic data using the session identifier and stores the media player state information and the web analytic data in an analytics store.

In one embodiment, the analytics engine receives the web analytics data responsive to a media player cookie associated with the media player matching a tracking cookie associated with the web page. For example, the media player cookie matches the tracking cookie if a user identifier associated with the media player cookie matches a user identifier associated with the tracking cookie.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

Embodiments are illustrated by way of example, and not by way of limitation in the figures of the accompanying drawings in which like reference numerals are used to refer to similar elements.

DETAILED DESCRIPTION

Figure 1:
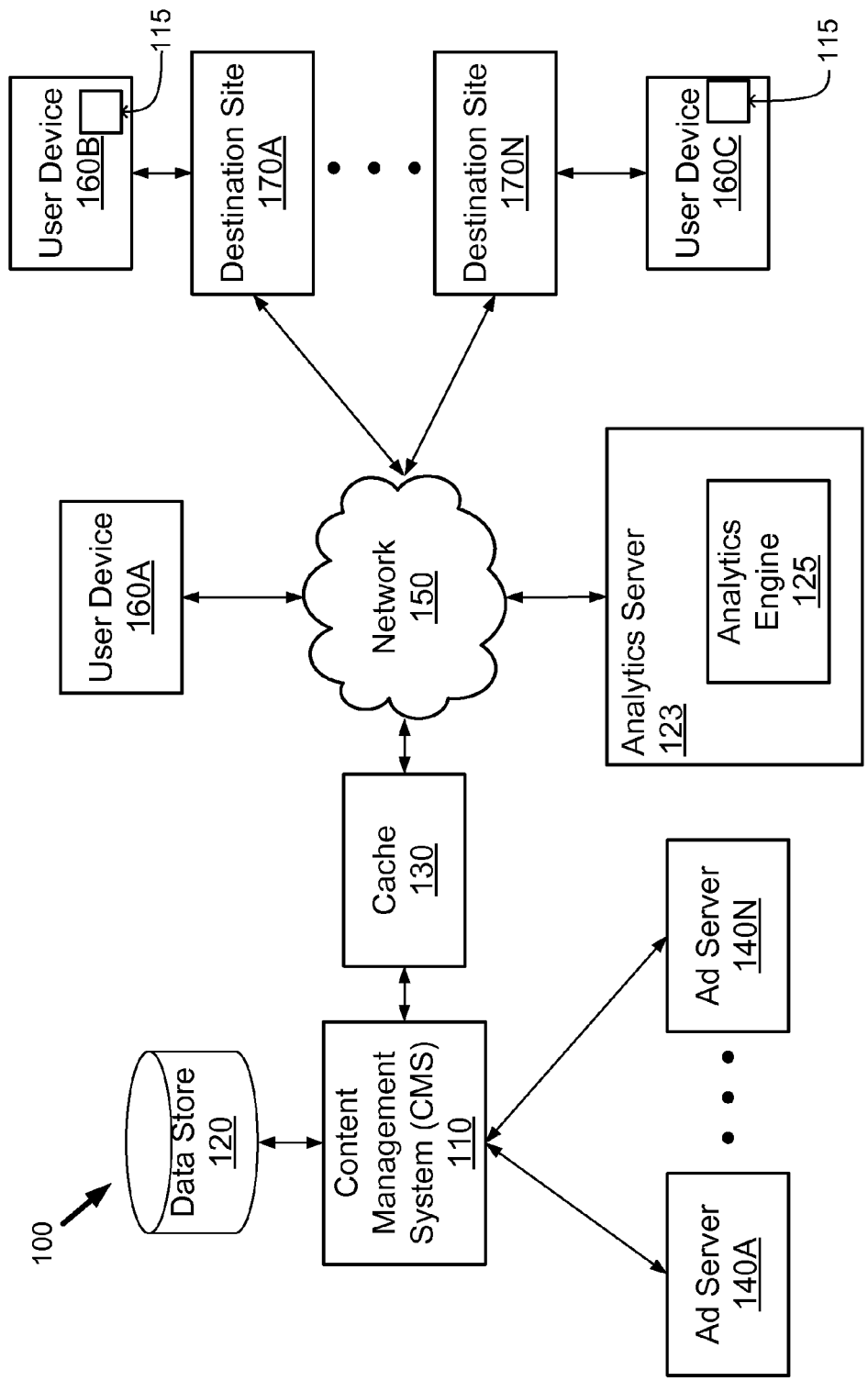
FIG. 1 is a block diagram of one embodiment of a computing environment for capturing video data and website analytic data in accordance an embodiment.

A system for analyzing video data interaction in conjunction with website interaction is described below. In the following description, for purposes of explanation, numerous specific details are set forth to provide a thorough understanding of the various embodiments. However, it will be apparent to one skilled in the art that the various embodiments can be practiced without these specific details. In other instances, structures and devices are shown in block diagram form in order to avoid obscuring the certain details. For example, an embodiment is described below with reference to user interfaces and particular hardware. However, other embodiments can be described with reference to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present embodiments also relate to an apparatus for performing the operations herein. This apparatus may be specially constructed for the required purposes, or it may be a general-purpose computer selectively activated or reconfigured by a computer program stored in the computer. The embodiments disclosed may take the form of an entirely hardware embodiment, an entirely software embodiment or an embodiment including both hardware and software elements. One embodiment is implemented in software comprising instructions or data stored on a computer-readable storage medium, which includes but is not limited to firmware, resident software, microcode or another method for storing instructions for execution by a processor.

Furthermore, the embodiments may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card. Examples of optical disks include compact disk-read only memory (CD-ROM), compact disk-read/write (CD-R/W) and digital video disc (DVD).

A data processing system suitable for storing and/or executing program code includes at least one processor coupled directly or indirectly to memory elements through a system bus. The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the algorithms and displays presented herein are not inherently related to any particular computer or other apparatus. Various general-purpose systems may be used with programs in accordance with the disclosure herein, or it may prove convenient to construct more specialized apparatus to perform the required method steps. The required structure for a variety of these systems will appear from the description below. It will be appreciated that a variety of programming languages may be used to implement the disclosure of the embodiments as described herein.

System Overview

FIG. 1 shows an embodiment of a system 100 for capturing video data and website analytic data. In the embodiment depicted by FIG. 1, the system 100 includes a content management system (CMS) 110, a data store 120, an analytics server 123 that includes an analytics engine 125, a cache 130, one or more advertisement servers ("ad servers") 140A-140N (also referred to individually and collectively as 140), a network 150, one or more user devices 160A, 160B, 160C (also referred to individually and collectively as 160) and one or more destination sites 170A-170N (also referred to individually and collectively as 170). Additionally, FIG. 1 also illustrates a media player 115 operating on one or more user devices 160. However, in other embodiments, the system 100 may include different and/or additional components than those depicted by FIG. 1.

The CMS 110 includes one or more processors and one or more storage devices storing data or instructions for execution by the one or more processors. For example, the CMS 110 is a server, a server array or any other computing device, or group of computing devices, having data processing and communication capabilities. The CMS 110 receives video data and metadata from one or more user devices 160 or other sources. The CMS 110 associates the metadata with the video data and communicates the metadata, video data and association between video data and metadata to the data store 110, allowing the data store 110 to maintain relationships between video data and the metadata. Additionally, the CMS 110 receives requests for stored video data from a user device 160 and retrieves video data and metadata associated with the stored video data from the data store 120.

The CMS 110 also generates data or instructions for generating a media player 115 used to present the video data when executed by a processor. In one embodiment, the data for generating the media player 115 is "embed code" that is included in a web page. The CMS 110 generates the data for media player 115 generation, such as embed code, based on the video data and the metadata associated with the video data. In an alternative embodiment, the analytics server 123 generates data or instructions for generating the media player 115.

Additionally, the CMS 110 includes data or instructions for generating one or more user interfaces displaying video data and metadata retrieved from the data store 120. The user interfaces generated by the CMS 110 simplify user review and modification of metadata associated with the video data, allowing users to more easily customize presentation of the video data to other users via a destination site 170 and presentation of content along with the video data. For example, a user interface generated by the CMS 110 allows a user to customize the branding or skin of an embedded media player 115 used to present the video data when retrieved from a destination site 170 by modifying the metadata used by the CMS 110 to generate media player configuration data. As another example, a user interface generated by the CMS 110 allows a user to customize the temporal location and placement of supplemental content, such as advertisements, within video data when the video data is presented by a media player 115 operating on a user device 160. The CMS 110 is further described below in conjunction with FIGS. 2A and 2B.

The data store 120 is a non-volatile memory device or similar persistent storage device and media coupled to the CMS 110 for storing video data and metadata associated with stored video data. For example, the data store 120 and the CMS 110 exchange data with each other via the network 150. Alternatively, the data store 120 and the CMS 110 exchange data via a dedicated communication channel. While the embodiment shown by FIG. 1 depicts the data store 120 and CMS 110 as discrete components, in other embodiments a single component includes the data store 120 and the CMS 110.

In one embodiment, the data store 120 includes one or more tables associating metadata with video data. For example, the data store 120 includes a table where an entry in the table includes a field identifying the video data and additional fields include metadata associated with the video data. Additionally, the data store 120 may include additional tables identifying data used by a destination site 170 when storing video data for access by user devices 160. In one embodiment, the data store 120 includes data mapping metadata associated with video data to data used by a destination site 170. The mapping of metadata associated with video data to data used by a destination site 170 allows the data store 120 to automatically map metadata associated with video data with one or more data fields used by a destination site 170, reducing the time for a destination site 170 to store and communicate video data from the data store 120 to a user device 160. In one embodiment, the data store 120 or the CMS 110 includes an index to expedite identification and/or retrieval of stored data from the data store 120.

The analytics server 123 is one or more devices having at least one processor coupled to at least one storage device including instructions for execution by the processor. For example, the analytics server 123 is one or more servers or other computing devices having data processing and data communication capabilities. The analytics server 123 tracks a website by receiving data describing website usage based on interactions with the website by user devices 160. In one embodiment, data from the user devices 160 is communicated to the analytics server 123 via the network 150. The data form the user devices 160 describes user interaction with web pages provided by a destination site 170 to a user device 160. For example, the analytics server 123 determines the location of user devices 160 accessing a website by Internet Protocol (IP) geo-location, performs click analytics describing interactions with a web page within a website, determines the number of times a web page has been loaded, determines the number of times the web page has been loaded by unique user devices 160 and/or determines other types of analytic data describing interaction with web pages within a web site. This allows the analytics server 123 to capture data describing how users interact with web pages from a destination site 170, data that is commonly identified as "web analytics data."

Additionally, the analytics server 123 receives data describing user interaction with video data included on one or more web pages from the destination site. For example, when a user device 160 accesses video data through a destination site 170, the user device 160 receives one or more web pages from the destination site 170 including the video data. One or more of the web pages received by the user device 160 include a media player 115 that is executed by the user device 160 to present the video data to the user. When the media player 115 is loaded by the user device 160, data is communicates from the media player 115 to the analytics server 123. Data from the media player 115 provides the analytics server 123 with information describing interaction with the video data presented by the media player 115. As an example, data from a media player 115 communicated to the analytics server 123 describes when the media player 115 was loaded by the user device 160, whether the media player 115 is used to play video, the length of time the media player 115 presents video data, whether video presented by the media player 115 is paused or other interactions between a user of the user device 160 and the media player 115.

Receiving data from the user device 160 describing website usage and data from the media player 115 describing interaction with video data within the website allows the analytics server 123 to generate data describing the effect of video content on website usage. Additionally, data generated by the analytics server 123 may also describe how elements within a web page affect user access of video data. For example, by analyzing website usage data and video data interactions, the analytics server 123 generates data describing how association of different thumbnail images with video data affects the frequency with which user devices 160 access the video data. In one embodiment, the analytics server 123 stores data describing the number of times a media player 115 is loaded by a user device 160 and used to present video data when different thumbnail images are associated with the video data, allowing identification of a thumbnail image that increases the frequency with which the video data is accessed.

Based on website usage data and video access data, the analytics server 123 generates one or more reports describing website usage, video access and/or video access in conjunction with website usage. For example, the analytics server 123 generates a report describing how video data is accessed whenever is it played back, regardless of the destination site 170 used to view the video data; the analytics server 123 may also generate a report describing video data access within a specific destination site 170, providing information about interaction with video data stored in a specific destination site 170. In one embodiment, the analytics server 123 includes data describing one or more predefined reports of website usage and/or video data interaction to simplify analysis. However, the analytics server 123 also receives data from a user device 160 describing generation of specific reports allowing a user to produce customized reports of website usage and/or video data interaction. The analytics server 123 and the analytics engine 125 are further described below in conjunction with FIG. 3.

The cache 130 is coupled to the content management system (CMS) 110 using the network 150 or using a direct communication channel between the CMS 110 and the cache 130. When a user device 160 or a destination site 170 retrieves video data from the data store 120, the CMS 110 communicates the video data to the cache 130, which stores a copy of the retrieved video data. Similarly, a request for video data from a user device 160 or a destination site 170 is initially transmitted via the network 150 to the cache 130 and the requested video data is communicated to the user device 160 or the destination site 170 by the cache 130 if a copy of the video data is stored by the cache 130. If the cache 130 does not include a copy of the requested video data, the request is communicated from the cache 130 to the CMS 110 to retrieve the video data. Hence, the cache 130 expedites retrieval of video data. While FIG. 1 illustrates a single cache 130, in other embodiments, the system 100 may include multiple caches 130.

The one or more advertisement servers ("ad servers") 140A-140N are one or more computing devices having a processor and a computer-readable storage medium storing advertisements and data for selecting advertisements. An ad server 140 communicates with the CMS 110 via the network 150 or via a communication channel with the CMS 110. Also, an ad server 140 communicates with destination sites 170 or user devices 160 via the network 150 to communicate advertisements for presentation when a web page is accessed. An ad server 140 also includes rules for targeting advertisements to specific users, for targeting advertisements to be displayed in conjunction with types of content, for targeting advertisements to specific locations or Internet Protocol (IP) addresses or other rules for selecting and/or targeting advertisements.

An ad server 140 receives metadata associated with video data from the CMS 110 and selects advertisements for presentation in conjunction with the video data based on the metadata. For example, the ad server 140 selects stored advertisements based on keywords associated with the video data. Thus, modification of the metadata associated with the video data using the CMS 110 enables modification of the advertisements presented in conjunction with the video data.

The network 150 is a conventional network and may have any number of configurations such as a star configuration, a token ring configuration or another configuration known to those skilled in the art. In various embodiments, the network 150 is a wireless network, a wired network or a combination of a wireless and a wired network. Furthermore, the network 150 may be a local area network (LAN), a wide area network (WAN) (e.g., the Internet) and/or any other interconnected data path across which multiple devices may communicate. In yet another embodiment, the network 150 may be a peer-to-peer network.

The network 150 may also be coupled to, or include, portions of a telecommunications network for communicating data using a variety of different communication protocols. In yet another embodiment, the network 150 includes a Bluetooth communication network and/or a cellular communications network for sending and receiving data. For example, the network 150 transmits and/or receives data using one or more communication protocols such as short messaging service (SMS), multimedia messaging service (MMS), hyper-text transfer protocol (HTTP), direct data connection, WAP, email or another suitable communication protocol.

The one or more user devices 160A, 160B, 160C are computing devices having data processing and data communication capabilities. For example, a user device 160 comprises a desktop computer, a laptop computer, a netbook computer, a tablet computer or a smartphone. In one embodiment, different user devices 160A, 160B, 160C comprise different types of computing devices. For example user device 160A may be a smartphone, user device 160B may be a tablet computer and user device 160C may be a laptop computer. A user device 160 receives data from a user identifying video data and transmits the received data to a destination site 170 or to the CMS 110 via the network 150. The user device 160 then receives the identified video data through the network 150, allowing presentation of the video data by the user device 160. Similarly, the user device 160 receives metadata associated with video data from a user and transmits the metadata to the CMS 110 via the network 150 or receives metadata associated with video data from the CMS 110 from the network 150, allowing a user to view and/or modify the metadata using the user device 160.

A user device 160 transmits data to the CMS 110 via the network 150 and receives data from the CMS 110 and/or the cache 130 via the network 150. For example, a user device 160 communicates video data to the CMS 110 via the network 150 or receives metadata associated with video data and/or user interface data from the CMS 110. Additionally, a user device 160 receives data from a destination site 170 using the network 150. For example, a user device 160 receives a media player 115 from a destination site 170 to view video data received from the destination site 170.

The destination sites 170A-170N are computing devices having data processing and data communication capabilities, such as web servers. A destination site 170 includes data describing a website that includes one or more web pages and communicates one or more web pages to a user device 160 via the network 150. One or more web pages stored by a destination site 170 include data or instructions for presenting video data by executing a media player 115 on the user device 160. In one embodiment, a destination site 170 retrieves video data and the media player 115 used to present the video data from the CMS 110, allowing the destination site 170 to present video data using the architecture of the CMS 110. Alternatively, a destination site 170 receives video data and media player configuration data from the CMS 110 and embeds the video data and media player configuration data into web pages to present video data. For example, a destination site 170 receives embed code describing operation of the media player 115 and identifying video data presented by the media player 115 and includes the embed code in a web page.

Thus, a user device 160 receives a web page from a destination site 170 to access content from the destination site 170 and communicates with the destination site 170 to navigate through a website maintained by the destination site. One or more web pages stored by the destination site 170 include video data that is presented to the user by a media player 115.

Content Management System (CMS) 110

Figure 2A:
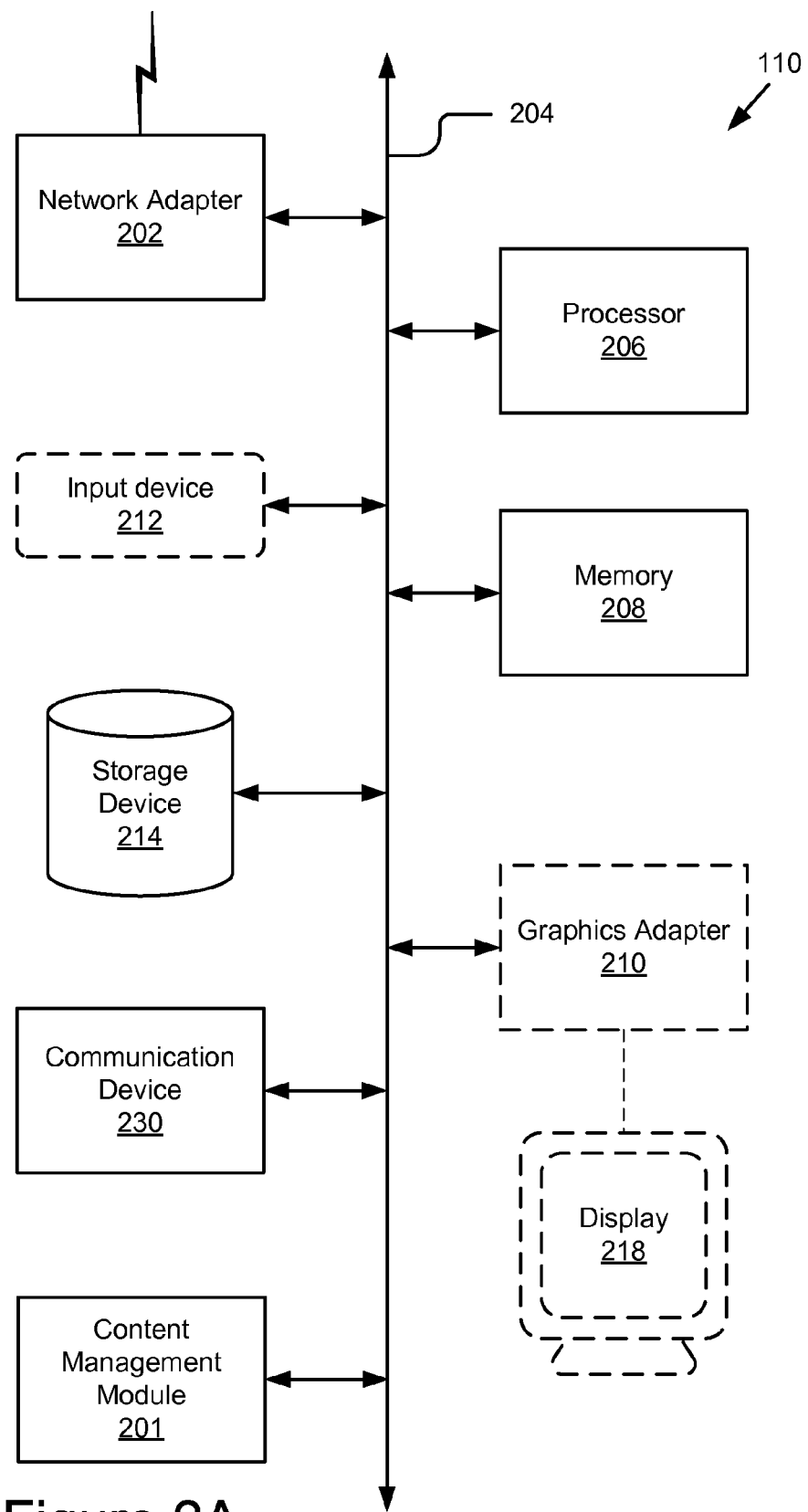
FIG. 2A is a block diagram of a content management system in accordance with an embodiment.

FIG. 2A is a block diagram of an embodiment of a content management system 110 in accordance with one embodiment. As illustrated in FIG. 2A, content management system 110 includes a network adapter 202 coupled to a bus 204. According to one embodiment, also coupled to the bus 204 are at least one processor 206, memory 208, a graphics adapter 210, an input device 212, a storage device 214, and a communication device 230. In one embodiment, the functionality of the bus 204 is provided by an interconnecting chipset. The content management system 110 also includes a display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the content management system 110. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The content management system 110 also includes an operating system executable by the processor such as but not limited to WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory such as a hard disk drive or flash drive for storing log information on a more permanent basis. The memory 208 is coupled by the bus 204 for communication with the other components of the content management module 110. In one embodiment, the content management module 201 is stored in memory 208 and executable by the processor 206.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In some embodiments, the storage device 214 includes instructions and/or data for maintaining metadata associated with video data, for modifying stored metadata or for retrieving stored video data or stored metadata associated with stored video data. For clarity, instructions and/or data stored by the storage device 214 are described herein as different functional "modules," where different modules are different instructions and/or data included in the storage device that cause the described functionality when executed by the processor 206.

The input device 212 may include a mouse, track ball, or other type of pointing device to input data into the content management system 110. The input device 212 may also include a keyboard, such as a QWERTY keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein. The network adapter 202 couples the content management system 110 to a local or wide area network.

The communication device 230 transmits data from the CMS 110 to the network 150 and receives data from the network 150. The communication device 230 is coupled to the bus 204. In one embodiment, the communication device 230 also exchanges data with one or more of the analytics server 123, the data store 120, the cache 130 and/or one or more advertising servers 140 using communication channels other than the network 150. In one embodiment, the communication device 230 includes a port for direct physical connection to the network 150 or to another communication channel. For example, the communication device 230 includes a USB, SD, CAT-5 or similar port for wired communication with the network 150. In another embodiment, the communication device 230 includes a wireless transceiver for exchanging data with the network 150, or with another communication channel, using one or more wireless communication methods, such as IEEE 802.11, IEEE 802.16, BLUETOOTH® or another suitable wireless communication method.

In yet another embodiment, the communication device 230 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 230 includes a wired port and a wireless transceiver. The communication device 230 also provides other conventional connections to the network 150 for distribution of files and/or media objects using standard network protocols such as TCP/IP, HTTP, HTTPS and SMTP as will be understood to those skilled in the art.

FIG. 2A further illustrates a content management module 201 communicating over bus 204 with the other components of the content management system 110. The content management module 201 provides logic and instructions for capturing and analyzing interactions with video data and interactions with web pages used to present the video data. In an embodiment, the content management module 201 can be implemented in hardware (e.g., in an FPGA), as illustrated in FIG. 2A. In another embodiment, the content management module 201 can include software routines and instructions that are stored, for example, in memory 208 and/or storage device 214 and executable by the processor 206 to cause the processer to capture and analyze interactions with video data and interactions with web pages used to present the video data. Details describing the functionality and components of the content management module 201 will be explained in further detail below with regard to FIG. 2B.

As is known in the art, the content management system 110 can have different and/or other components than those shown in FIG. 2A. In addition, the content management system 110 can lack certain illustrated components. In one embodiment, the content management system 110 lacks an input device 212, graphics adapter 210, and/or display 218. Moreover, the storage device 214 can be local and/or remote from the content management system 110 (such as embodied within a storage area network (SAN)).

As is known in the art, the content management system 110 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Content Management Module 201

Figure 2B:
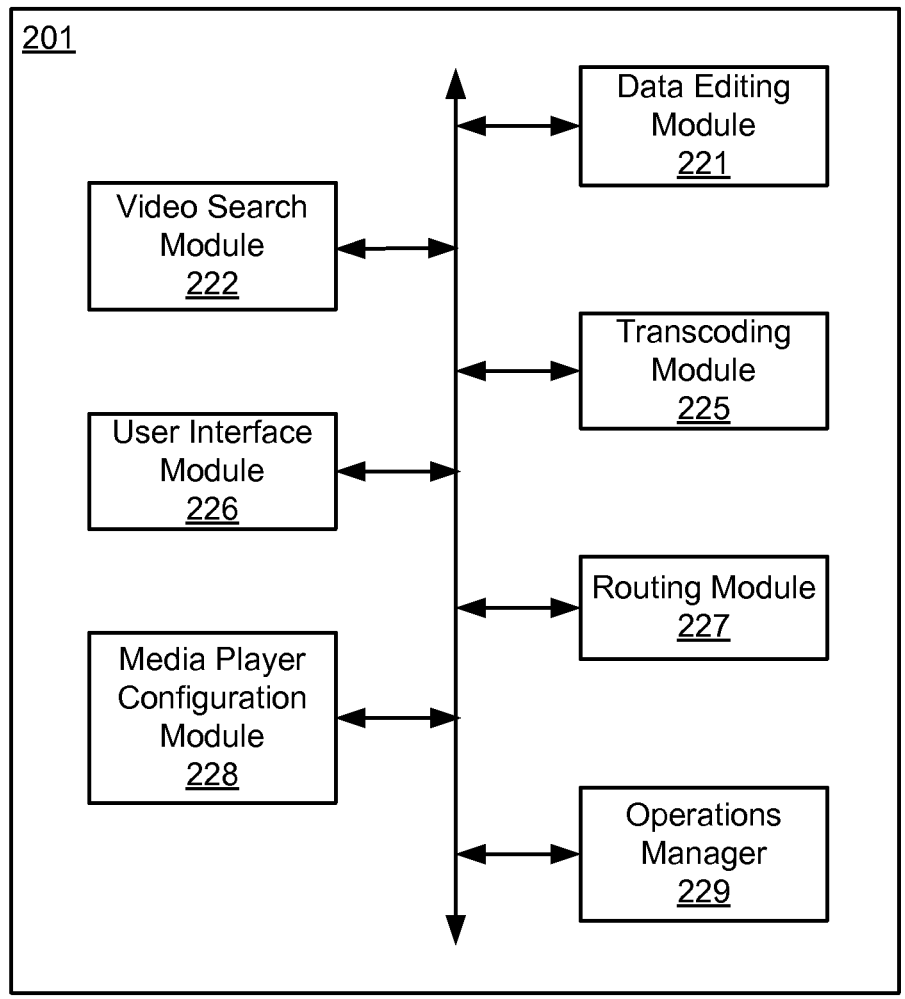
FIG. 2B is a block diagram illustrating a content management module in accordance with an embodiment.

FIG. 2B is a block diagram illustrating the content management module 201 according to one embodiment. The content management module 201 is software and routines executable by the processor 206 for capturing and analyzing interactions with video data and interactions with web pages used to present the video data. In one embodiment, the content management module 201 is a set of instructions executable by the processor 206 to provide the functionality described below for capturing and analyzing interactions with video data and interactions with web pages used to present the video data within the system 100. In another embodiment, the content management module 201 is stored in the memory 208 of the content management system 110 and is accessible and executable by the processor 206. In either embodiment, the content management module 201 is adapted for cooperation and communication with the processor 206 and other components of the content management system 110.

In the embodiment depicted by FIG. 2B, the content management module 201 includes a metadata editing module 221, a video search module 222, a transcoding module 225, a user interface module 226, a routing module 227, a media player configuration module 228 and an operations manager 229. However, in other embodiments, the storage device 214 includes different and/or additional modules than the ones depicted in FIG. 2B. The content management module 201 is coupled to the processor 206 and the communication device 230 via a bus 204. However, in other embodiments the content management module 201 may include different and/or additional components than the ones shown by FIG. 2B.

In one embodiment, the modules are implemented using instructions and/or data included in the storage device 214, in another embodiment, the modules are implemented using one or more hardware devices configured to provide the functionality further described below. For example, the modules are implemented using one or more application specific integrated circuits (ASICs) and/or one or more field programmable gate arrays (FPGAs) coupled via the bus 204 configured to provide the functionality of the modules further described below.

The data editing module 221 is software and routines executable by the processor 206 for modifying metadata and/or video data stored in the data store 120. In one embodiment, the data editing module 221 receives data from the user interface module 226 and uses the received data to generate or modify metadata that is stored by the data store 120. Additionally, the data editing module 221 generates or modifies playlists including a sequence of video data based on data received from a user device 160 via the user interface module 226. For example, the user interface module 226 receives data from a user device 160, via the network 150 and the bus 204, modifying stored metadata associated with video data or identifying metadata for association with video data. The data editing module 221 then modifies metadata associated with the video data using the received data or stores the received metadata and an association between the received metadata and video data, as further described below.

In one embodiment, the data editing module 221 generates an instruction identifying the metadata to be modified and the modification to the metadata or identifying metadata and video data associated with the metadata. The generated instruction is then transmitted to the data store 120 by the communication device 230 to modify the metadata. Similarly, the data editing module 221 generates an instruction modifying a playlist, identifying modifications to the video data included in the playlist or identifying one or more attributes associated with the playlist to be modified. The generated instruction is transmitted to the data store 120 via the bus 204, communication device 230 and the network 150.

The video search module 222 is software and routines executable by the processor 206 for generating data or instructions for retrieving video data from the data store 120 based on received input, such as search terms. The video search module 222 searches the data store 120 for metadata matching, or similar to, search terms received from the communication device 230 and/or from the user interface module 226. Hence, the video search module 222 allows users to more easily retrieve stored video data using metadata associated with the stored video data. For example, the video search module 222 accesses the data store 120 via the network 150, communication device 230 and the bus 204 to identify video data stored by the data store 120 and associated with metadata matching, or similar to, search terms received from the communication device 230 and/or from the user interface module 226.

Rather than require navigation through a directory structure to retrieve stored video data, like conventional data retrieval, the video search module 222 searches metadata associated with stored video data to identify and retrieve stored video data. In one embodiment, the video search module 222 also receives data limiting the metadata to which the search terms are compared. For example, the video search module 222 receives input limiting comparison of search terms to metadata specifying video title and not to other metadata. The video search module 222 also receives data from the data store 120 describing stored video data associated with metadata matching, or similar to, the search terms. The video search module 222 communicates the description of the stored video data to the user interface module 226 via the bus 204, and the user interface module 226 generates a user interface presenting the video data from the data store 120 to a user.

The transcoding module 225 is software and routines executable by the processor 206 for generating a copy of the video data encoded in a different format than the video data's original format. The transcoding module 225 includes one or more codecs for generating differently encoded copies of the video data. For example, the transcoding module 225 includes multiple video codecs, such as H.262/MPEG-2 Part 2 codecs, H.264/MPEG-4 Advanced Video Coding codecs, MPEG-4 Part 2 codecs, VP8 codecs or other video codecs. By storing different video codecs, the transcoding module 225 enables generation of a compressed version of stored video data by encoding the video data with one or more of the stored video codecs. The differently-encoded copy of the video data is communicated to the data store 120 for storage and association with the original video data.

In one embodiment, the transcoding module 225 automatically encodes video data received by the CMS 110 using one or more predetermined codecs to generate one or more compressed versions of the video data, which are stored in the data store 120 along with the original video data. For example, the transcoding module 225 automatically encodes video data using one or more commonly-used codecs, such as one or more H.264/MPEG-4 Advanced Video Coding codecs or one or more VP8 codecs. This simplifies distribution of the video data to destination sites 170 by automatically generating compressed versions of the video data using codecs most commonly used by destination sites 170. In one embodiment, input received by the user interface module 226 allows a user to specify one or more codecs that are automatically applied to video data. For example, a user specifies a list of codecs to produce compressed video data compatible with user-desired destination sites 170, allowing the CMS 110 to automatically generate video data compatible with the user-desired destination sites 170.

The transcoding module 225 may also receive input via the user interface module 226, allowing manual identification of a codec and encode video data using the identified codec. Additionally, a user may communicate one or more codecs to the CMS 110 via the network 150 and the transcoding module 225 stores the user-supplied codecs for subsequent use. Additionally, destination sites 170 may communicate codecs to the transcoding module 225 via the network 150, allowing the transcoding module 226 to dynamically modify the codecs used. The transcoding module 226 may also modify the one or more codecs automatically applied to video data responsive to data from destination sites 170 and/or from user devices 160, enabling dynamic modification of video encoding as different and/or additional codecs become more commonly used.

The user interface module 226 is software and routines executable by the processor 206 for generating one or more user interfaces for receiving data from a user and/or presenting video data and/or metadata associated with video data to a user. For example, the user interface module 226 includes instructions that, when executed by a processor 206, generate user interfaces for displaying metadata associated with video data and/or modifying metadata associated with video data. In one embodiment, data stored in the interface module 226 is communicated to a user device 160 via the communication device 230 and the network 150, and a processor included in the user device 160 generates a user interface by executing the instructions provided by the user interface module 226.

In one embodiment, a user interface generated by the interface module 226 displays metadata, associated with video data, stored by data store 120 and receives modification to the stored metadata. The user interface module 226 also generates a user interface identifying stored video data associated with a user that is retrieved from the data store 120, expediting the user's review of previously stored video data. Additionally, the user interface module 226 generates a user interface for receiving user input to upload video data from a user device 120 to the data store 120 to facilitate publication of the video data using the CMS 110.

The routing module 227 is software and routines executable by the processor 206 for identifying a destination for data received by the content management system (CMS) 110 or processed by the CMS 110. After the routing module 227 determines the destination, the communication device 230 transmits the data to the determined destination using the bus 204 and/or the communication device 230. In one embodiment, the routing module 227 includes a routing table associating destinations with different types of data and/or with different commands. For example, the routing module 227 determines that editing commands from the data editing module 221 are routed to the data store 120 and determines that search commands from the video search module 222 are routed to the data store 120. As additional examples, the routing module 227 determines that data from the user interface module 226 is directed to a user device 160 or determines that website usage data or video access data is transmitted to the analytics server 123.

The media player configuration module 228 is software and routines executable by the processor 206 for generating data describing a media player 115 for presenting video data by a user device 160. In one embodiment, the media player configuration module 228 generates embed code for generation and execution of a media player 115 by a user device 160. Alternatively, the media player configuration module 228 generates a media player 115, or a media player configuration, that is communicated from the CMS 110 to a user device 160 via the network. For example, the media player configuration module 228 generates a Hypertext Markup Language version 5 (HTML5) media player. The embed code or media player 115 generated by the media player configuration module 228 is included in a web page so that when a user device 160 accesses the web page, the embed code or other data is executed by the user device 160 to generate a media player 115 that presents video data on the user device 160. While conventional techniques for distributing video data rely on media players 115 having a predefined appearance and size, the media player configuration module 228 enables customization of media player 115 appearance. For example, the media player configuration module 228 allows a user to customize a skin displayed with the media player 115. Hence, the media player configuration module 228 allows generation of a media player 115 that is not associated with a destination site 170. For example, the media player configuration module 228 generates a media player 115 without an identifier of a destination site 170 used to distribute the video data and/or a media player 115 including visual data determined from user-supplied data stored by the media player configuration module 228 or by the data store 120.

Additional customizations of the media player 115 are enabled by the media player customization module 228. For example, the media player configuration module 228 allows application of domain restrictions or geographic restrictions to the media player 115 to limit domains in which the media player is able to present video data or to limit geographic regions in which the media player is able to present video data, respectively. In one embodiment, the media player configuration module 228 stores a blacklist identifying domains or geographic regions in which the media player 115 is unable to present video data. Alternatively, the media player configuration module 228 stores a whitelist identifying domains or geographic regions in which the media player 115 is able to present video data. In other embodiments, the media player configuration module 228 includes both a whitelist and a blacklist of domains or geographic regions for limiting presentation of video data by the media player 115.

The operations manager 229 is software and routines executable by the processor 206 for generating modifications to metadata stored in the data store 120 and schedules modification of the stored metadata. Additionally, the operations manager 229 determines when data stored by the data store 120 is changed and notifies the CMS 110 when stored data has been changed using the communication device 230 and/or the network 150 or another connection to the data store 120. In one embodiment, the operations manager 229 maintains one or more queues for scheduling modification of stored metadata or communicating new metadata to the data store 120. The operations manager 229 also communicates changes to stored metadata to one or more destination sites 170 via the communication device 230 and the network 150, allowing a destination site 170 to receive the most current metadata. In one embodiment, the operations manager 229 generates a queue or other schedule specifying the timing of communication of metadata to one or more destination sites 170.

Analytics Server 123

Figure 3:
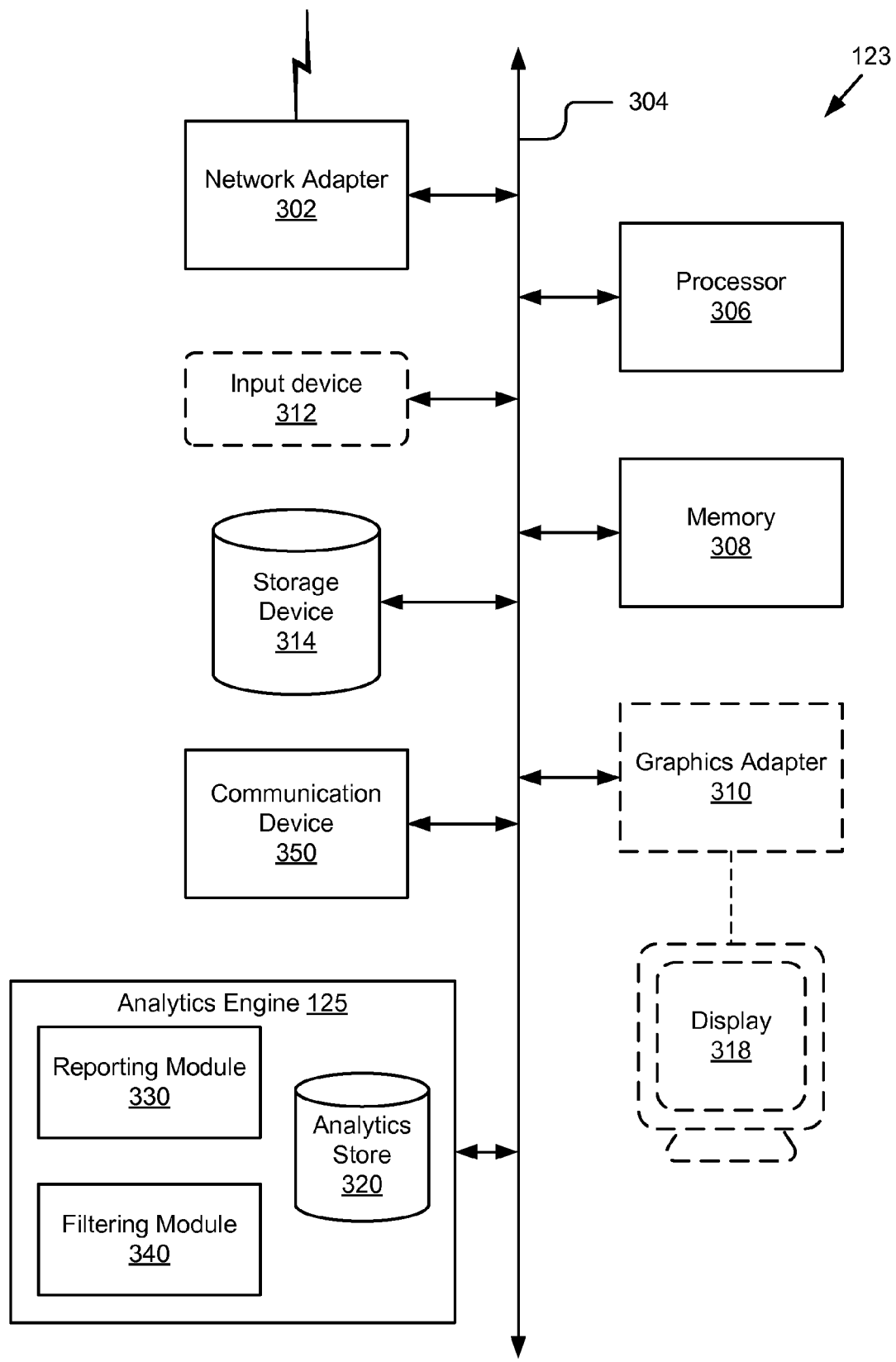
FIG. 3 is a block diagram of an analytics server and analytics engine in accordance with an embodiment.

Referring now to FIG. 3, the analytics server 123 and analytics engine 125 are shown in more detail. As illustrated in FIG. 3, the analytics server 123 includes a network adapter 302 coupled to a bus 304. According to one embodiment, also coupled to the bus 304 are at least one processor 306, memory 308, a graphics adapter 310, an input device 312, a storage device 314, and a communication device 350. In one embodiment, the functionality of the bus 304 is provided by an interconnecting chipset. The analytics server 123 also includes a display 318, which is coupled to the graphics adapter 310.

The processor 306 may be any general-purpose processor. The processor 306 comprises an arithmetic logic unit, a microprocessor, a general purpose controller or some other processor array to perform computations, provide electronic display signals to display 318. The processor 306 is coupled to the bus 304 for communication with the other components of the analytics server 123. Processor 306 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The analytics server 123 also includes an operating system executable by the processor such as but not limited to WINDOWS®, MacOS X, Android, or UNIX® based operating systems.

The memory 308 holds instructions and data used by the processor 306. The instructions and/or data comprise code for performing any and/or all of the techniques described herein. The memory 308 may be a dynamic random access memory (DRAM) device, a static random access memory (SRAM) device, flash memory or some other memory device known in the art. In one embodiment, the memory 308 also includes a non-volatile memory such as a hard disk drive or flash drive for storing log information on a more permanent basis. The memory 308 is coupled by the bus 304 for communication with the other components of the analytics server 123. In one embodiment, the analytics engine 125 is stored in memory 308 and executable by the processor 306.

The storage device 314 is any device capable of holding data, like a hard drive, compact disk read-only memory (CD-ROM), DVD, or a solid-state memory device. The storage device 314 is a non-volatile memory device or similar permanent storage device and media. The storage device 314 stores data and instructions for processor 308 and comprises one or more devices including a hard disk drive, a floppy disk drive, a CD-ROM device, a DVD-ROM device, a DVD-RAM device, a DVD-RW device, a flash memory device, or some other mass storage device known in the art. In some embodiments, the storage device 314 includes instructions and/or data for maintaining metadata associated with video data, for modifying stored metadata or for retrieving stored video data or stored metadata associated with stored video data. For clarity, instructions and/or data stored by the storage device 314 are described herein as different functional "modules," where different modules are different instructions and/or data included in the storage device that cause the described functionality when executed by the processor 306.

The input device 312 may include a mouse, track ball, or other type of pointing device to input data into the analytics server 123. The input device 312 may also include a keyboard, such as a QWERTY keyboard. The input device 312 may also include a microphone, a web camera or similar audio or video capture device. The graphics adapter 310 displays images and other information on the display 318. The display 318 is a conventional type such as a liquid crystal display (LCD) or any other similarly equipped display device, screen, or monitor. The display 318 represents any device equipped to display electronic images and data as described herein. The network adapter 302 couples the analytics server 123 to a local or wide area network.

The communication device 350 transmits data from the analytics server 123 to the network 150 and receives data from the network 150. The communication device 350 is coupled to the bus 304. In one embodiment, the communication device 350 also exchanges data with one or more of the CMS 110, the data store 120, the cache 130 and/or one or more advertising servers 140 using communication channels other than the network 150. In one embodiment, the communication device 350 includes a port for direct physical connection to the network 150 or to another communication channel. For example, the communication device 350 includes a USB, SD, CAT-5 or similar port for wired communication with the network 150. In another embodiment, the communication device 350 includes a wireless transceiver for exchanging data with the network 150, or with another communication channel, using one or more wireless communication methods, such as IEEE 802.11, IEEE 802.16, BLUETOOTH® or another suitable wireless communication method.

In yet another embodiment, the communication device 350 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 350 includes a wired port and a wireless transceiver. The communication device 350 also provides other conventional connections to the network 150 for distribution of files and/or media objects using standard network protocols such as TCP/IP, HTTP, HTTPS and SMTP as will be understood to those skilled in the art. FIG. 3 further illustrates an analytics engine 125 communicating over bus 304 with the other components of the analytics server 123. In an embodiment, the analytics engine 125 includes software and routines executable by a computer processor. In the embodiment depicted by FIG. 3, the analytics engine 125 includes an analytics store 320, a reporting module 330 and a filtering module 340. In other embodiments the analytics engine 125 may include different and/or additional components than the ones shown by FIG. 3.

The analytics engine 125 provides logic and instructions for receiving web analytics data, associating media player state information with the web analytic data and storing the media player state information and the web analytic data. In an embodiment, the analytics engine 125 can be implemented in hardware (e.g., in an FPGA), as illustrated in FIG. 3. In another embodiment, the analytics engine 125 can include software routines and instructions that are stored, for example, in memory 308 and/or storage device 314 and executable by the processor 306 to cause the processer for receiving web analytics data, associating media player state information with the web analytic data and storing the media player state information and the web analytic data. Details describing the functionality and components of the analytics engine 125 will be explained in further detail below.

As is known in the art, the analytics server 123 can have different and/or other components than those shown in FIG. 3. In some embodiments, the analytics server 123 includes components such as those described in FIG. 3, such as the network adapter 302, the input device 312, the storage device 314, the graphics adapter 310 and the display 318. In addition, the analytics server 123 can lack certain illustrated components. In one embodiment, the analytics server 123 lacks the input device 312, graphics adapter 310, and/or display 318. Moreover, the storage device can be local and/or remote from the analytics server 123 (such as embodied within a storage area network (SAN)).

As is known in the art, the analytics server 123 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device, loaded into the memory, and executed by the processor 310.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

As mentioned above, the analytics engine 125 includes an analytics store 320, a reporting module 330 and a filtering module 340. The analytics store 320 is a persistent storage device that stores data received from one or more user devices 160 and media players 115 via the network 150 and the communication device 350. The analytics store 320 includes data received from a user device 160 describing interaction with web pages ("web analytics") and includes data received from a media player 115 describing interaction with video data presented using a web page. Storing both web analytics and video data interaction in the analytics store 320 allows a portion of the temporal order in which a user interacts with web pages within a web site and with video content presented using the web pages to be captured. For example, including video data interactions and web analytics allows the data store 320 to include data describing a sequence in which web pages are accessed and identify an order of video data interactions.

As an example, when a user device 160 accesses a first web page from a destination site 170A, the analytics engine 125 receives data from the user device 160 identifying that the first page was loaded by the user device 160 and stores the data in the analytics store 320. While accessing the first web page, if a user accesses video data included in the first web page, the media player 115 used to access the video data transmits data to the analytics engine 125 via the network 150 indicating that the video data is accessed. The analytics engine 125 stores the data form the media player 115 identifying that the video data is accessed, allowing the analytic store 320 to store data indicating that the first web page was initially accessed and then the video data was accessed. In one embodiment, the analytics store 320 stores web analytics data and video data interactions using a visit identifier, so that interactions with web pages and video data during a visit are maintained according to the visit identifier.

Hence, the analytics store 320 includes data describing interaction with video data, allowing subsequent analysis of video data interaction, as well as web analytic data, allowing analysis of user interaction with web pages within a website. As further described below in conjunction with FIG. 4, the web analytic data and video data interactions may be associated with each other to enable analysis of video analytics and website interaction.

The reporting module 330 comprises a computer-readable storage medium including data that, when executed by the processor 310 or another processor, generates a report of website usage, video data interaction or website usage and video data interaction from data stored in the analytics store 320. In one embodiment, the reporting module 330 also includes data describing one or more predefined reports to expedite generation of the predefined reports. For example, the reporting module 330 stores data for generating a video viewing report identifying the number of total views and unique views of different video content. The reporting module 330 receives a selection of a predefined report via a communication device (e.g., network interface) then retrieves video data interactions or web analytic data from the analytic store 320 and generates the selected data. Alternatively, the reporting module 330 receives a description of a report from the communication device, allowing a user to specify parameters for generating a customized report. For example, the reporting module 330 receives a request for a report describing video data interactions within a specified geographic region or for a report describing the frequency with which users perform certain types of interaction with a media player 115 presenting the video data. Examples of reports generated by the reporting module 330 are further described below in conjunction with FIGS. 7-11.

The filtering module 340 comprises a computer-readable storage medium including data that, when executed by the processor 310 or another processor, generates a subset of data from the analytics store 320 based on one or more identified criteria. The filtering module 340 is configured to communicate with the analytics store 320 and the communication device 350. In one embodiment, the filtering module 340 receives the one or more criteria from the communication device 350 and extracts data from the analytics store 320 according to the received criteria. For example, the filtering module 340 retrieves video data interactions for a specific website or retrieves video data interactions for video data associated with received keywords or metadata. The data retrieved by the filtering module 340 is then communicated to a user device 160, communication device 350 and the network 150.

Methods

Figure 4:
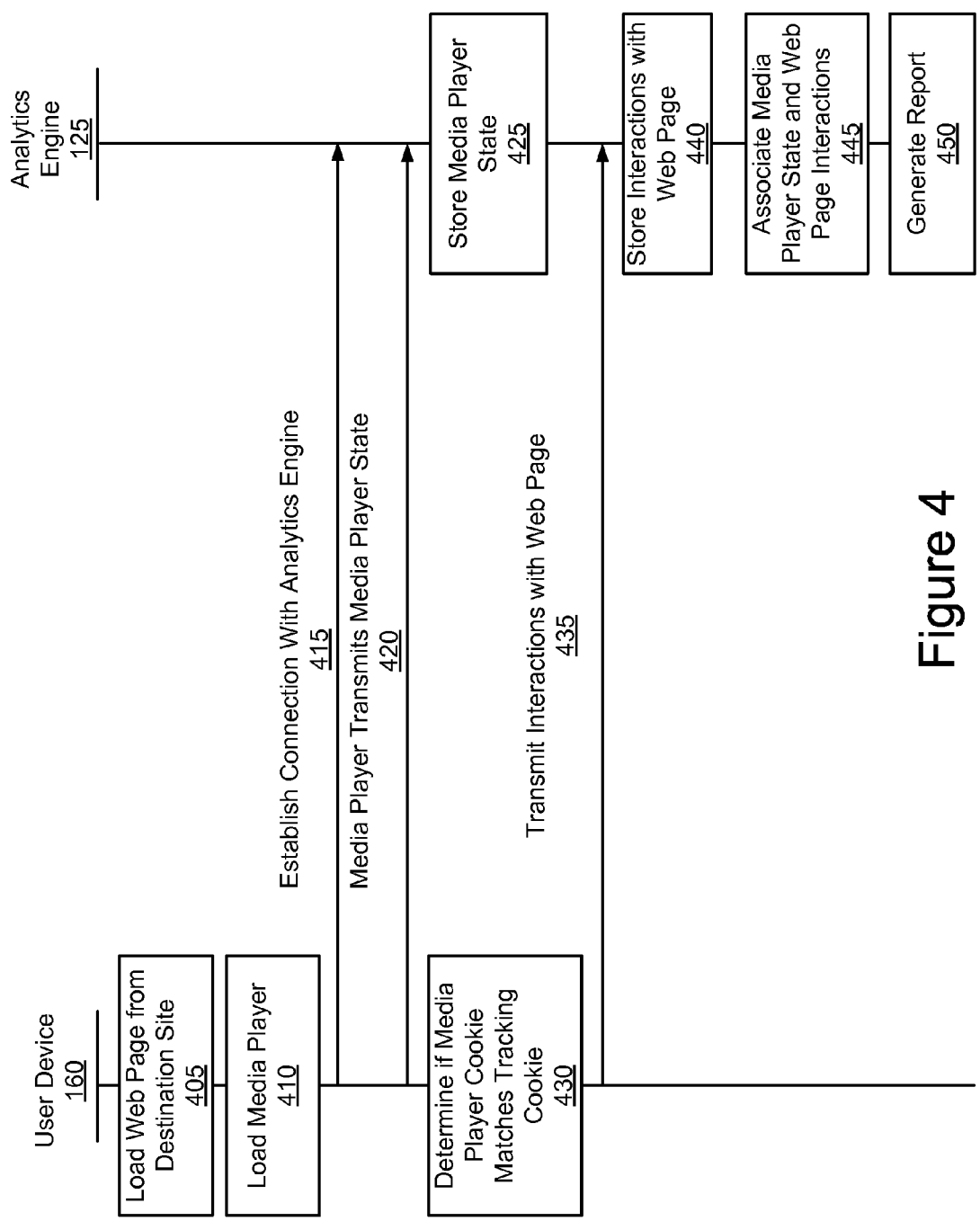
FIG. 4 is an event diagram of a method for capturing web analytic data and video data interactions in accordance with an embodiment.

FIG. 4 illustrates an event diagram of a method for capturing web analytic data and video data interactions. In the example shown by FIG. 4, the user device 160 receives a web page including video data from a destination site 170. Upon receiving the web page, the user device 160 loads 405 the web page. For example, the user device 160 executes data, such as a structured document, to display the web page from the destination site 170. While loading 405 the web page, the user device 160 loads 410 the media player 115 identified by the web page. For example, the user device 160 executes embed code included in the web page, causing the media player 115 to load.

When the media player 115 has loaded 410, the media player 415 establishes 415 a connection with the analytics engine 125 via the network 150. Using the established connection the media player 115 transmits 420 media player state information to the analytics engine 125. In one embodiment the media player 115 transmits 420 the media player state information at periodic intervals so the analytics engine 125 receives constant information about the state of the media player 115. Alternatively, the media player 115 transmits 420 the media player state information responsive to receiving an interaction. For example, the media player 115 transmits 420 the media player state information responsive to receiving an input from a user or responsive to receiving data from the CMS 110, from an ad server 140 or from a destination site 170. In one embodiment, the media player state information includes video data identifier, an identifier of the web page in which the video data is presented, an identifier associated with the user device 160 and data describing interaction with the video data.

For example, the media player 115 transmits 420 a title associated with the video data, a Uniform Resource Indicator (URI) of the web page including the video data, an Internet Protocol (IP) address of the user device 160 and one or more media player 115 state descriptions. Examples of media player state descriptions include: an indication that the media player 115 is loaded, an indication the media player 115 is playing the video data, an indication the media player 115 is paused, an indication the media player is stopped 115, an indication the media player 115 is displaying an advertisement, a percentage of the video data presented by the media player 115, a length of time that the media player 115 has presented video data or any other data describing how the media player 115 presents video data. In an embodiment, the media player state information includes additional data, such as data describing whether the web page receives an input indicating a user's preference for the video data, whether the web page receives an input from a user to share the video data, an identifier associated with a web page which referred the user to the current web page or any other data describing access to or interaction with the media player 115 and/or the video data.

The analytics engine 125 stores 425 the media player state information in the analytics store 320. As the media player 115 transmits 420 additional media player state information, the analytics engine 125 stores 425 the additional media player state information. In addition to storing 425 media player state information, the analytics engine 125 also stores web analytic data if the website maintained by the destination site 170 is also tracked by the analytics engine 125. However, even if the website maintained by the destination site 170 is not tracked by the analytics engine 125, the media player state information is stored 425 to allow monitoring and analysis of video data interaction.

To determine whether the website maintained by the destination site 170 from which the web page was loaded 405 is also tracked by the analytics engine 125, the media player 115 determines 430 whether a tracking cookie included in the web page matches a media player cookie associated with the media player 115. If a website is being tracked by the analytics engine 125, web pages comprising the web site include a tracking cookie. In one embodiment, the tracking cookie included in the web page is a first party cookie. For example, the tracking cookie is associated with a domain used by the destination site 170 to maintain the website. The tracking cookie included in a web page tracked by the analytics engine 125 includes a visitor identifier, a visit identifier, a user identifier and data associated with the web page.

However, the analytics engine 125 uses a third-party cookie for the media player cookie. The third-party media player cookie is associated with a domain that differs from the domain associated with the domain used by the destination site 170 to maintain the website. For example, the media player cookie is associated with a domain associated with the analytics engine 125. By using a third party cookie as the media player cookie, the analytics engine 125 allows access to the video data presented by the media player 115 to be tracked across different domains. Hence, the third party media player cookie includes a user identifier that is the same across different websites that present the video data allowing data to be captured about video data interaction even if the video data is copied to different websites.

Hence, to determine 430 if the tracking cookie matches the media player cookie, the media player 115 determines whether the user identifier of the tracking cookie matches the user identifier of the media player cookie. If the media player 115 determines 420 that the tracking cookie matches the media player cookie, interactions with the web page are transmitted 435 from the user device 160 to the analytics engine 125 via the network 150. By determining 430 if the user identifier of the tracking cookie and the user identifier of the media player cookie match, the media player 115 initially determines whether the web site and the video data are commonly owned before transmitting 435 web page interactions, or "web analytics data," to the analytics server 125. Additionally, if the media player 115 determines 430 that the user identifier of the tracking cookie and the user identifier of the media player cookie match, the media player 115 associates a session identifier with the tracking cookie and the media player cookie.

If web analytics data are received, the analytics server 125 stores 440 the web analytics data in the analytics store 320 and associates 445 the stored media player state information with the stored web analytics data. Thus, the analytics server 125 separately receives the web analytics data and the media player communication device 350 state information then associates 445 the web analytics data and the media player state information. For example, the analytics engine 125 associates 445 video interaction data and web analytics data using the session identifier associated with the tracking cookie and the media player cookie. Associating media player state information and web analytics data using the session identifier allows the analytics store 320 to maintain data describing different sessions that include web analytics and media player state information.

Using the stored web analytic and media player state information, the reporting module 330 of the analytics engine 125 generates 450 a report using the associated video interaction data and web analytics data. For example, a predefined report described by data stored in the reporting module 330 identifies data from the analytics store 320 that is retrieved and included in a report for review by a user. As another example, the reporting module 330 receives data from the communication module 350 and the bus 304 identifying data for inclusion in a report and retrieves the identified data from the analytics engine 320 and presents the identified data as a report. Thus, the reporting module 330 extracts data from the analytics engine 125 to allow a user to review a combination of interaction with video data and navigation through pages of a website to modify the video data presented on web pages or the layout and ordering of web pages within the web site.

However, if the media player 115 determines 430 that the media player cookie does not match the tracking cookie, web analytics data is not transmitted to the analytics engine 125. For example, if the media player 115 determines 430 that the user identifier of the tracking cookie does not match the user identifier of the media player cookie, interactions with the web page are not transmitted 435. Thus, even if the website from which the video data is accessed by the user device 160 is not being tracked by the analytics engine 125, the analytics engine 125 still stores 425 media player state information to enable tracking of interactions with video data.

Figure 5:
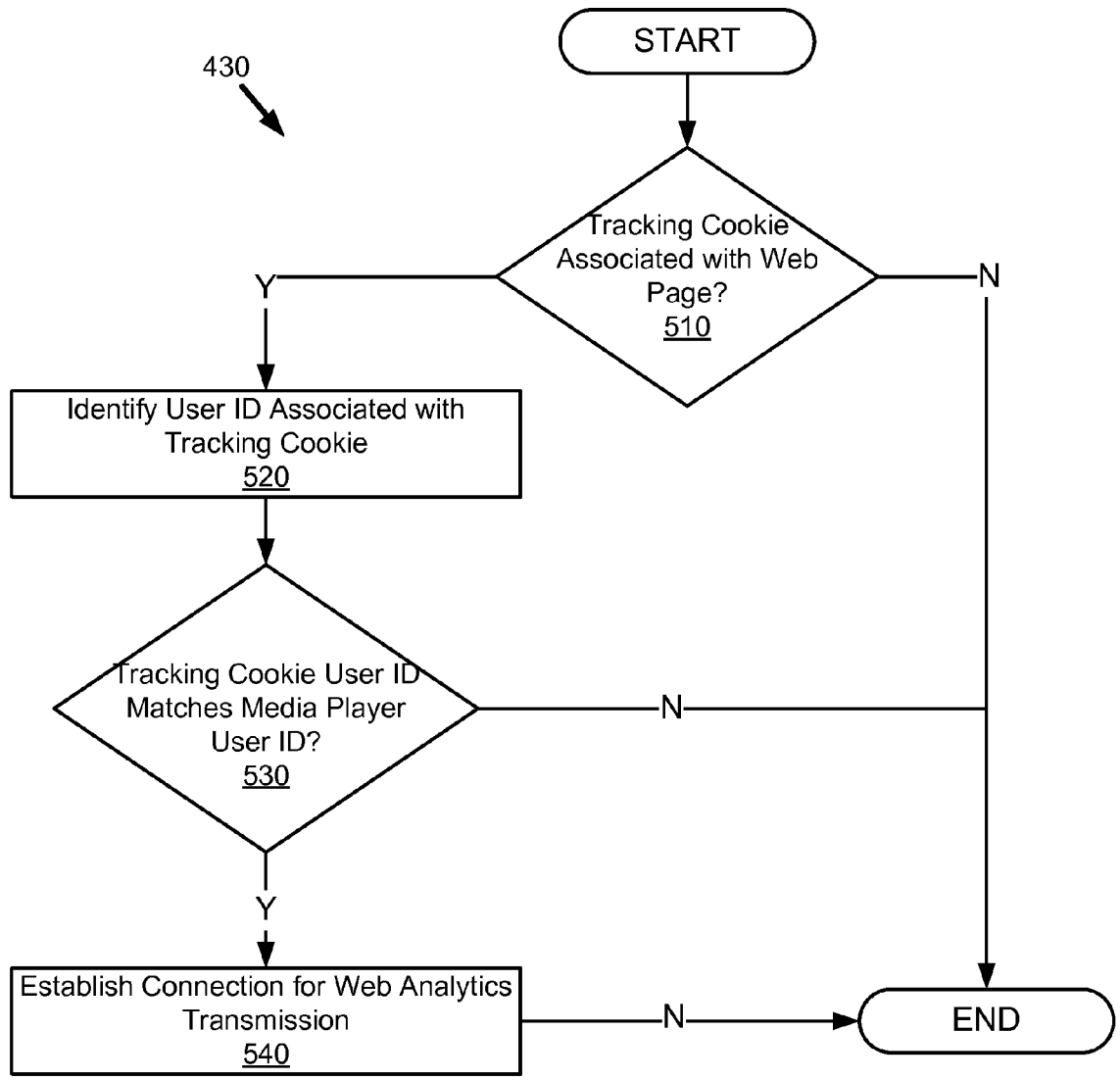
FIG. 5 is a flow chart of a method for determining whether a media player cookie matches a web page tracking cookie in accordance with an embodiment.

FIG. 5 is a flow chart of one embodiment of a method for determining 430 whether a media player cookie matches a web page tracking cookie in accordance with an embodiment. In one embodiment, the steps identified by FIG. 5 are performed by the media player 115 executing on the user device 160.

Initially, the media player 115 determines 510 whether a tracking cookie is associated with the web page in which the media player is launched. For example, the media player 115 places a call to the web page to identify the web page tracking cookie. If no information identifying the web page tracking cookie is received from the web page or if the media player is otherwise unable to identify the web page tracking cookie, the method ends. Accordingly, web analytics data is not transmitted to the application store because the web page is not being tracked by the analytics engine 125; however, media player state information is transmitted to the analytics engine 125 to allow tracking of video data interaction.

However, if the media player 115 determines 510 that a web page tracking cookie is associate with the web page, the media player identifies 520 a user identifier associated with the web page tracking cookie. For example, the web page communicates the web page tracking cookie or data identifying the web page tracking cookie to the media player 115. The media player 115 then identifies 510 the user identifier associated with the web page tracking cookie. Alternatively, the web page identifies 510 the user identifier associated with the web page tracking cookie.

The media player 115 then determines 530 whether the user identifier associated with the web page tracking cookie matches a user identifier associated with the media player cookie. If the user identifier associated with the web page tracking cookie does not match a user identifier associated with the media player cookie, the method ends and web analytics data is not transmitted to the analytics engine 125. For example, if the user identifier associated with the web page tracking cookie differs from the media player cookie, the web page and the media player are owned by different entities so web analytics data is not transmitted in addition to the media player state information. However, the media player state information is transmitted to the analytics engine 125.

Responsive to the user identifier associated with the web page tracking cookie matching the user identifier associated with the media player cookie, the media player 115 initiates a command to establish 540 a connection between the user device 160 and the analytics engine 125. In one embodiment, the media player 115 associates a session identifier with the tracking cookie and the media player cookie. The session identifier is included with the web analytics data and the media player state information transmitted to the analytics engine 125. Associating a session identifier with the media player state information and the web analytics data allows the analytics engine 125 to associate the received web analytics data and media player state information with each other in a session that includes web analytics and media player state information.

Figure 6:
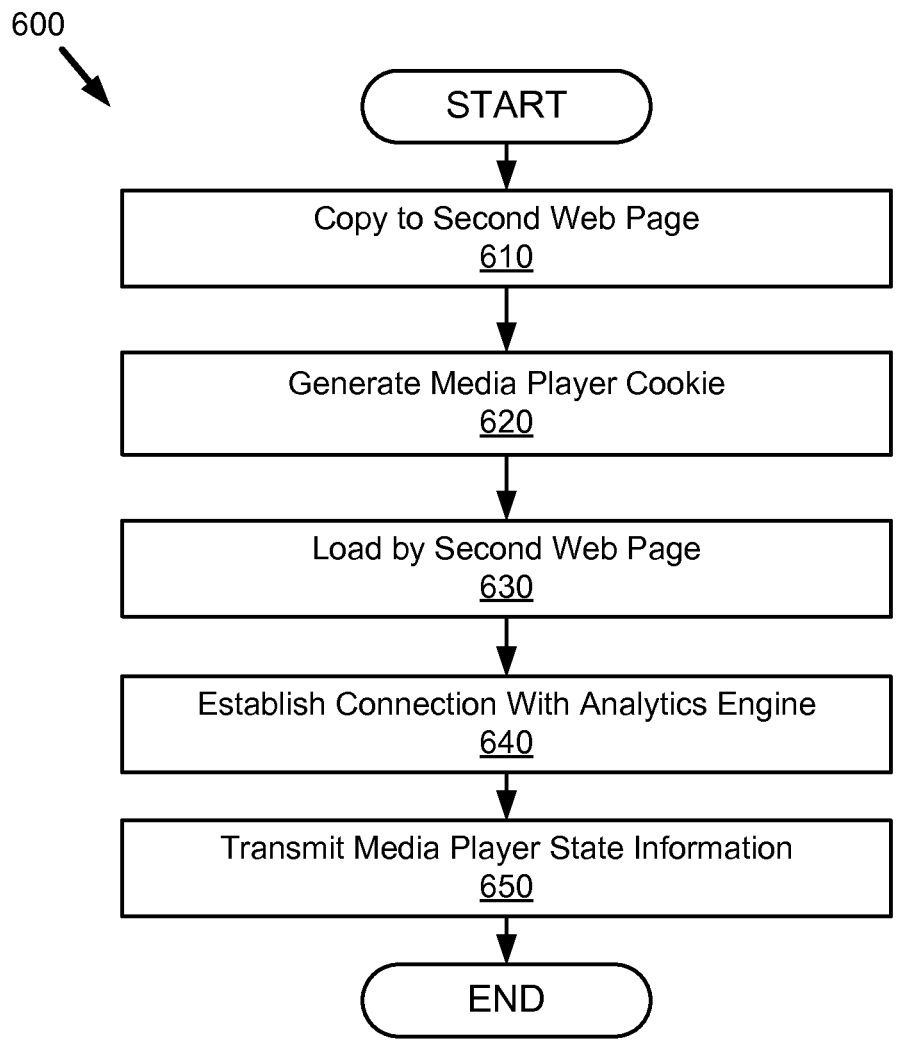
FIG. 6 is a flow chart of a method for capturing video data interaction from a media player copied from a first web page to a second web page in accordance with an embodiment.

FIG. 6 is a flow chart of a method 600 for capturing video data interaction when a media player 115 presenting video data is copied from a first web page that is tracked by the analytics engine 125 to a second web page that is not tracked by the analytics engine 125. For example, if the media player 115 is copied from a first website to a second website that is not tracked by the analytics engine 125, the media player 115 also transmits media player state information to the analytics engine 125 to continue providing data describing interaction with the video data.

The media player 115 presenting the video data is copied 610 from first web page to a second web page. In the example of FIG. 6, the second web page is included in a website that is not tracked by the analytics engine 125, so the analytics engine 125 does not receive web analytics data from the website including the second web page. When the media player 115 is copied to the second web page, the copy of media player 115 generates 620 a media player cookie. Because the media player cookie is a third party cookie, as described above in conjunction with FIG. 4, the media player tracking cookie generated by the copy of the media player 115 is associated with the same user identifier as the media player cookie associated with the media player 115 included in the first web page.

The generated media player cookie includes tracking data to provide information describing the propagation of the video data to various websites. For example, the media player cookie initially includes tracking data identifying the website initially presenting the video data. In one embodiment, the tracking data includes an identifier associated with the website presenting the video data. When the media player 115 is copied from the first web page to the second web page, the copy of the media player 115 generates 620 a media player cookie including tracking data identifying the website including the first web page and the website including the second web page. This allows the tracking data to identify the website from which the copy of the media player 115 originated as well as the website which receives the copy of the media player 115. For example, if the website including the first web page is associated with an identifier of "1" and the website including the second web page is associated with an identifier of "2," the media player cookie generated 620 by the copy of the media player 115 includes tracking data having a format similar to "1,2." This allows the media player cookie to identify the source of the video data using the identifier of "1" and the current website including the video data using the identifier of "2."

When the copy of the media player 115 included on the second web page is loaded 630 by a user device 160, the copy of the media player 115 establishes 640 a connection with the analytics engine 125 via the network 150. Using the established connection the copy of the media player 115 transmits 650 media player state information to the analytics engine 125. In one embodiment the copy of the media player 115 transmits 650 the media player state information at periodic intervals so the analytics engine 125 receives constant information about the state of the copy of the media player 115. Alternatively, the copy of the media player 115 transmits 650 the media player state information responsive to receiving an interaction. For example, the copy of the media player 115 transmits 650 the media player state information responsive to receiving an input from a user or responsive to receiving data from the CMS 110, from an ad server 140 or from a destination site 170. In one embodiment, the media player state information includes video data identifier, the address of the web page in which the video data is presented, an identifier associated with the user device 160 and data describing interaction with the video data.

For example, the copy of the media player 115 transmits 650 a title associated with the video data, a Uniform Resource Indicator (URI) of the web page including the video content, an Internet Protocol (IP) address of the user device 160, the tracking data and one or more media player 115 state descriptions. Examples of media player state descriptions include: an indication that the media player 115 is loaded, an indication the media player 115 is playing the video data, an indication the media player 115 is paused, an indication the media player is stopped 115, an indication the media player 115 is displaying an advertisement, a percentage of the video data presented by the media player 115, a length of time that the media player 115 has presented video data or any other data describing how the media player 115 presents video data. In an embodiment, the media player state information includes additional data, such as data describing whether the web page receives an input indicating a user's preference for the video data, whether the web page receives an input from a user to share the video data, an identifier associated with a web page which referred the user to the current web page or any other data describing access to or interaction with the media player 115 and/or the video data.

Thus, even when a media player 115 is copied to a web page that is not tracked by the analytics engine 125, the copy of the media player 115 transmits 650 media player state information to the analytics engine 125. This allows the analytics engine 125 to receive additional information describing interaction with video data. Additionally, because the copy of the media player 115 and the media player 115 are associated with the same user identifier, the data from the copy of the media player 115 provides additional information about access to the video data associated with the user identifier. Further, transmitting 650 tracking data to the analytics engine 125 allows a user to analyze how video data is spread to various websites.

Example Reports

Figures 7, 8:
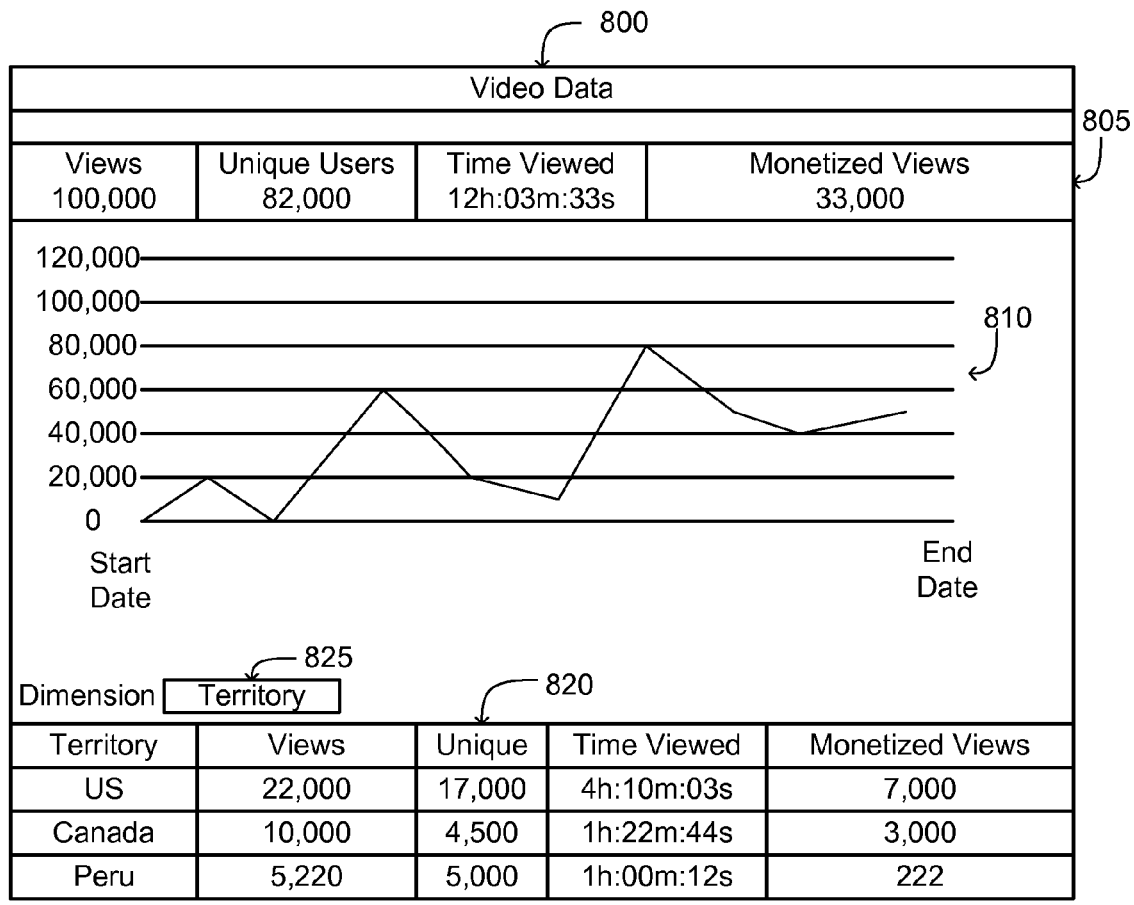
FIG. 7 is an example of a video library overview report in accordance with an embodiment.
FIG. 8 shows an example of a video summary report in accordance with an embodiment.

Using data received from a media player 115 and/or a user site, the analytics engine 125 generates one or more reports describing interactions with video data and/or web analytics. For example, FIG. 7 illustrates a video library overview report 700 generated by the reporting module 330 of the analytics engine 125. The video library report 700 includes a video library summary 710. The video library summary 710 includes a video library identifier, such as a name, and data describing interactions with video data included in the video library. A video library includes video data. For example, the video library summary 710 identifies the number of times a media player 115 including video data from the video library has been loaded by a web page, the number of times video data from the video library has been viewed using the media player, the number of unique viewers of video data from the video library and the total number of minutes of video data from the video library that has been watched. However, the video library 710 may include different and/or additional data than that identified above and illustrated in FIG. 7. For example, the content of the video library summary 710 may be customized for different users.

FIG. 8 shows an example of a video summary report 800 generated by the reporting module 330 of the analytics engine 125. In the example shown by FIG. 8, the video summary report 800 describes the performance of video data across multiple websites to provide a user with a summary of overall interactions with video data. The video summary report 800 includes a summary section 805 summarizing different interactions with video data. In the example of FIG. 8, the summary section 805 identifies the number of times the video data has been viewed, the number of unique viewers of the video data, the total time of the video data that has been viewed and the number of video views that resulted in monetization. However, in other embodiments, the summary section 805 identifies different and/or additional interactions with the video data.

In one embodiment, the video summary report 800 also displays a video data interaction graph 810 providing a graphical representation of the number of times the video data has been viewed in a specified interval. However, in other embodiments the video data interaction graph 810 provides a graphical representation of a different type of video data interaction, such as unique viewers, monetized views or any other type of interaction with video data. Additionally, the video summary report 800 includes a dimensional detail view 820 which displays specific information about interactions with video data. A dimensional selector 825 allows a user to identify the type of information displayed in the dimensional detail view 820. In the example of FIG. 8, the dimensional detail view 820 displays information about video data interaction in different territories, allowing a user to review interactions with video data in different geographic regions. However, in other embodiments, the dimensional detail view 820 displays different types of data about video data interactions, allowing a user to analyze different aspects of video data interactions.

Figure 9:
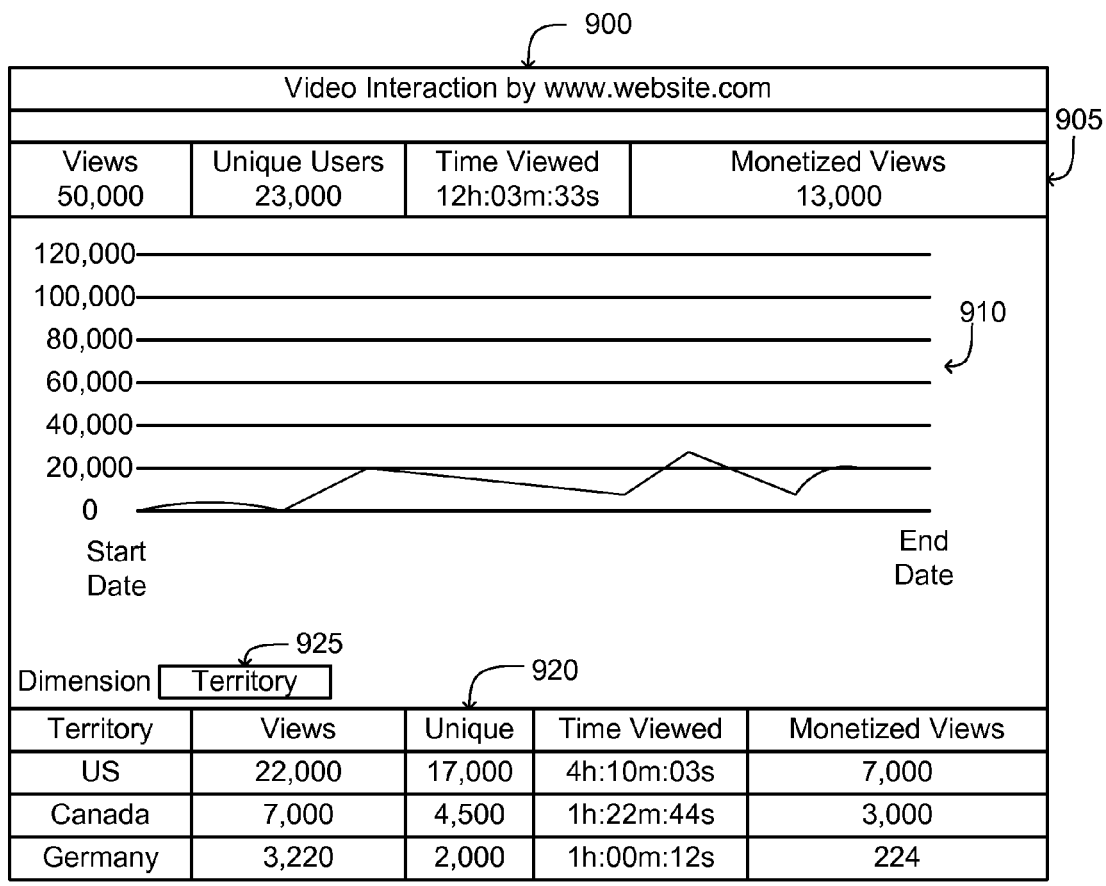
FIG. 9 shows an example of a website video summary report in accordance with an embodiment.

FIG. 9 shows an example of a website video summary report 900 generated by the reporting module 330 of the analytics engine 125. While the video summary report 800 shown by FIG. 8 describes interactions with video data received from multiple websites, the website video summary report 900 describes interactions with video data received from a single website. Thus, the website video summary report 900 allows a user to analyze user interaction with video data presented by the single website.

In one embodiment, the reporting module 330 generates the website video summary report 900 by retrieving media player state information having web page identifiers associated with the single website. Hence, the media player state information associated with web pages within the single website is used by the reporting module 330 to generate the website video summary report 900. In the example shown by FIG. 9, the website video summary report 900 identifies the website for which video data interactions are described. For example, FIG. 9 shows video data interactions received for video data presented by "www.website.com."

The website video summary report 900 includes a summary section 905 summarizing different interactions with video data presented by the website. In the example of FIG. 9, the summary section 905 identifies the number of times the video data has been viewed using the website, the number of unique viewers of the video data using the website, the total time of the video data that has been viewed using and the number of video views using the website that resulted in monetization. However, in other embodiments, the summary section 905 identifies different and/or additional interactions with the video data.

In one embodiment, the website video summary report 900 also displays a video data interaction graph 910 providing a graphical representation of the number of times the video data has been viewed using the website in a specified interval. However, in other embodiments the video data interaction graph 910 provides a graphical representation of a different type of video data interaction, such as unique viewers, monetized views or any other type of interaction with video data. Additionally, the website video summary report 900 includes a dimensional detail view 920 which displays specific information about interactions with video data using the website. A dimensional selector 925 allows a user to identify the type of information displayed in the dimensional detail view 920. In the example of FIG. 9, the dimensional detail view 920 displays information about video data interaction in different territories, allowing a user to review interactions with video data in different geographic regions. However, in other embodiments, the dimensional detail view 920 displays different types of data about video data interactions, allowing a user to analyze different aspects of video data interactions.

Figure 10:
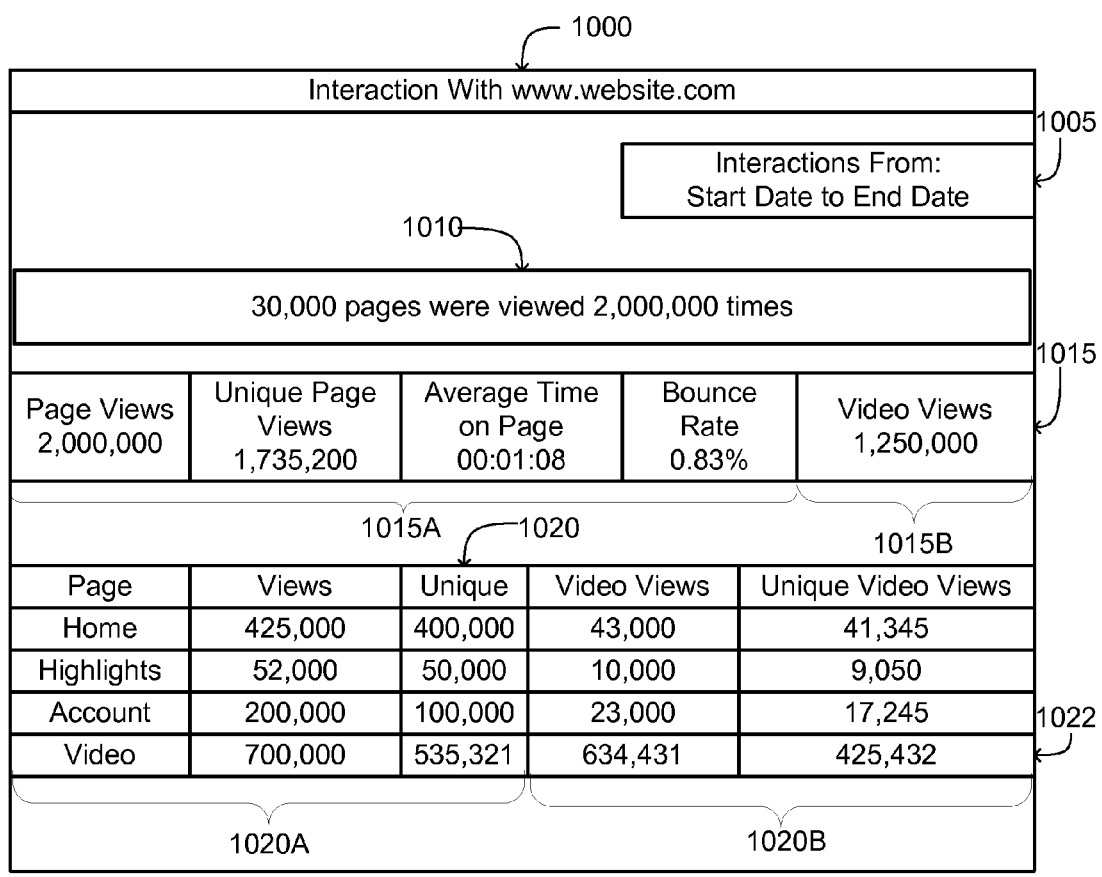
FIG. 10 shows an example of a report describing video data interaction and web page interaction in accordance with an embodiment.

FIG. 10 shows an example of a report 1000 describing video data interaction and web page interaction, also referred to herein as an "interaction report 1000." When video data is included in one or more web pages within a website, data describing performance of the video data within the one or more web pages allows the video data publisher to determine the effectiveness of the video data. Hence, the interaction report 1000 provides data about video data interaction in context of interactions with web pages included in the website.

The interaction report 1000 identifies the website for which video data interactions and web page interactions are described. For example, FIG. 10 shows video data interactions and video data interactions for web pages and video data included in "www.website.com." In one embodiment, the interaction report 1000 includes a date selector 1005 identifying the time frame for which the interaction report 1000 displays data and allowing the user to identify a time frame in for which the interaction report 1000 displays data. In the example shown by FIG. 10, the date selector 1005 indicates that the video data interactions and video data interactions shown occurred between "Start Date" and "End Date." The interaction report also includes a website summary 1010 identifying the number of web pages included in the website and the total number of times web pages included in the website have been viewed. In the example of FIG. 10, the website summary 1010 indicates that the website includes 30,000 web pages and that web pages within the website have been viewed 2,000,000 times.

The interaction report 1000 also includes a website overview 1015 having a web page interaction region 1015A describing interactions with multiple web pages within the website and a video data interaction region 1015B describing interactions with multiple video data included in different web page pages within the website. In the example of FIG. 10, the website overview 1015 identifies the total number of views of web pages within the website, the total number of unique views of web pages within the website, the average time spent viewing a web page within the website, the percentages of visits to the website in which the visitor left the website from the initially viewed web page (the "bounce rate") and the total number of views of video data within the website. However, in additional embodiments, the website overview 1015 includes different and/or additional information, such as the number of unique views of video data within the website, the total number of minutes of video data that has been viewed on the website or other suitable data. In one embodiment, the reporting module 330 stores data identifying the information presented by the website overview 1015, allowing a user to customize the content of the website overview 1015.

A web page detail listing 1020 identifies different web pages included in the website and data describing interactions with the web pages and with video data included on the web page. In one embodiment, the web page detail listing 1020 is a table where each row in the table corresponds to a web page included in the website. Additionally, the web page detail listing 1020 may be organized into a web page interaction section 1020A displaying data describing interactions with the web page itself and a video data interaction section 1020B displaying data describing interactions with video data included on the web page. In the example of FIG. 10, the web page interaction section 1020A identifies the web page using an identifier or a name, a number of views of the web page and a number of unique views of the web page. Also in the example of FIG. 10, the video data interaction section 1020B identifies a number of views of video data included in a web page and the number of unique views of video data included on the web page.

For example, in FIG. 10, row 1022 of the web page detail listing 1020 includes data associated with the web page having a title of "Video." The web page interaction section 1020A describes the number of views of the web page titled "Video" and the number of unique views of the web page titled "Video." Additionally, the video data interaction section 1020B describes the number of views of video data included in the web page titled "Video" and the number of unique views of video data included in the web page titled "Video."

In other embodiments, the interaction report 1000 displays different and/or additional data describing interactions with web pages or interactions with video data than that shown in FIG. 10. For example, the web page detail listing 1020 identifies the total number of minutes or percentage of video viewed on a web page, the number of different video data viewed on a web page or any other suitable data describing interaction with video data included in a web page. Similarly, in various embodiments, the web page detail listing 1020 includes different and/or additional data describing interaction with different web pages, such as bounce rate associated with different web pages, average time spent on different web pages.

Figure 11:
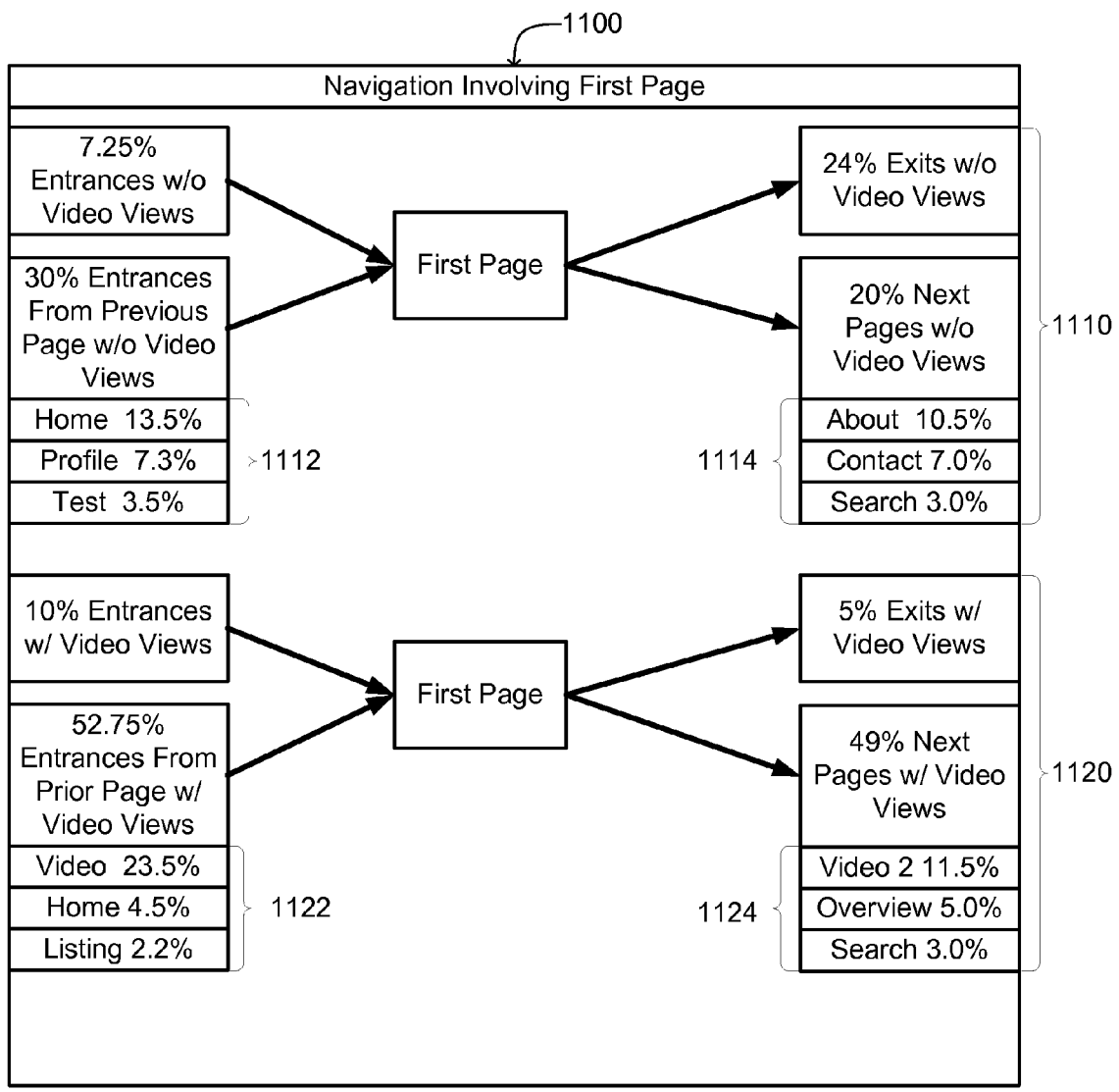
FIG. 11 shows an example of a website navigation report accounting for video data interaction in accordance with an embodiment.

FIG. 11 shows an example of a website navigation report 1100 accounting for video data interaction. The website navigation report 1100 describes how users navigate between web pages included in a web site, allowing analysis of how users traverse pages within the website and how inclusion of video data on a web page affects navigation to and from the web page.

In the example of FIG. 11, a first page within a website has been identified, specified as "First Page" in FIG. 11, and the website navigation report 1100 describes navigation to and from the identified first page. For example, the website navigation report identifies a previous page that is a web page accessed prior to accessing the identified first page and a next page that is a web page accessed after accessing the first page. Thus, the website navigation report 1100 describes a navigation path from the previous page to the identified first page and then to the next page.

In one embodiment, the reporting module 330 generates the website navigation report 1100 by receiving a selection of the first page and retrieving data from the analytics store 320 having a web page identifier associated with the first page. From the retrieved data having a web page identifier associated with the first page, the reporting module 330 identifies referring web page identifiers to identify the previous pages. Hence, the referring web page identifiers allow the reporting module 330 to determine the web pages visited prior to visiting the first page. Additionally, the reporting module 330 determines a session identifier associated with web analytics data associated with the referring web page identifiers to determine whether a media player 115 was used to play video data included in one or more of the referring web pages.

After identifying the previous web pages, the reporting module 330 retrieves data from the analytics store 320 where the referring web page identifier associated with the data is the web page identifier of the first page. This allows the reporting module 330 to identify the web pages which were accessed after viewing the first page. Hence, web pages having a referring web page identifier associate with the first paged stored in the analytics engine 320 specify the next pages identified by the website navigation report 1100. Additionally, the reporting module 330 determines a session identifier associated with web analytics data associated with the first page to determine whether a media player 115 was used to play video data included in the first page.

In one embodiment, such as that shown by FIG. 11, the website navigation report 1100 organizes the displayed data based on whether video data included on the first page was viewed. In the example of FIG. 11, the website navigation report includes a first description 1110, including data where video data is not viewed, and a second description 1120, including data where video data is viewed. For example, the first description 1100 includes data describing navigation paths from one or more previous pages to the first page and then to one or more next pages when video data is not viewed and the second description 1120 includes data describing navigation paths from one or more previous pages to the first page and then to one or more next pages when video data is viewed.

Additionally, the website navigation report 1100 may identify the previous pages and the next pages to enable analysis of the pages accessed when video data is viewed as well as analysis of the pages accessed when video data is not viewed. For example, the first description 1100 includes a previous page listing 1112 identifying web pages accessed prior to the first page and a next page listing 1114 identifying web pages accessed after the first page is accessed. Similarly, the second description 1120 includes a second previous page listing 1122 identifying web pages accessed prior to the first page and a second next page listing 1124 identifying web pages accessed after the first page is accessed. Hence, comparing the previous page listing 1112 and the second previous page listing 1122 allows evaluation of how viewing video data affects navigation to the first web page. Similarly, comparing the next page listing 1114 and the second next page listing 1124 allows evaluation of how viewing video data affects navigation from the first page to other web pages in the website.

In one embodiment, the reporting module 330 generates the first description 1110 and the second description 1120 by identifying sessions from the analytics store 320 including a web page identifier associated with the first page or a referring web page identifier associated with the first page. From the identified sessions, the reporting module 330 identifies sessions that do not include media player state information indicating a media player 115 played the video data and sessions that include media player state information indicating a media player 115 played the video data. By analyzing the sessions without media player state information indicating the video data was played, the reporting module 330 generates the first description 1110. Similarly, by analyzing sessions including media player state information indicating video data was played, the reporting module generates the second description 1120. Hence, the first description 1110 identifies the frequency with which the first page is accessed from one or more previous pages without interacting with video data on the previous pages and identifies the frequency with which the next page is accessed from the first page when video data on the first page is not accessed. The second description 1120 identifies the frequency with which the first page is accessed from one or more previous pages after interacting with video data on the previous pages and identifies the frequency with which the next page is accessed from the first page when video data on the first page is accessed.

In the example of FIG. 11, the previous page listing 1112, the next page listing 1114, the second previous page listing 1122 and the second next page listing 1124 identify the percentages of times different web pages are accessed. In other embodiments, the previous page listing 1112, the next page listing 1114, the second previous page listing 1122 and the second next page listing 1124 identify the number of times different web pages are accessed or another metric describing the frequency with which web pages are accessed. Additionally, the first description 1110 identifies the number of times the website is exited after interacting with the first page and the second description 1120 identifies the number of times the website is exited after interacting with the first page and interacting with video included on the first page.

The foregoing description of the embodiments has been presented for the purposes of illustration and description. It is not intended to be exhaustive or to limit the present embodiments to the precise form disclosed. Many modifications and variations are possible in light of the above teaching. It is intended that the scope of the present embodiments be limited not by this detailed description, but rather by the claims of this application. As will be understood by those familiar with the art, the present embodiments may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiments or its features may have different names, divisions and/or formats. Furthermore, as will be apparent to one of ordinary skill in the relevant art, the modules, routines, features, attributes, methodologies and other aspects of the present embodiments can be implemented as software, hardware, firmware or any combination of the three. Also, wherever a component, an example of which is a module, of the present embodiments is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiments are in no way limited to implementation in any specific programming language, or for any specific operating system or environment. Accordingly, the disclosure intended to be illustrative, but not limiting, of the scope of the embodiments, which is set forth in the following claims.

What is claimed is:

1. A system comprising:
  a computer readable medium;
  a processor; and
  at least one module, stored in the computer readable medium and executable by the processor, the at least one module comprising instructions for:
    receiving media player state information from a media player associated with a first cookie that is a media player cookie, the media player state information associated with a session identifier and describing an interaction with video data;
    receiving web analytics data describing an interaction with a web page including the media player, the web page associated with a second cookie that is a tracking cookie and that matches the first cookie, the web analytics data associated with the session identifier, the receiving of the web analytics data being responsive to the media player determining the media player cookie matches the tracking cookie;
    associating the media player state information with the web analytics data using the session identifier; and
    storing the media player state information and the web analytics data in an analytics store.

2. The system of claim 1, wherein the media player state information comprises:
  a video data identifier, a web page identifier associated with the web page, an address of a user device loading the web page and a media player state description.

3. The system of claim 2, wherein the media player state description is at least one of: an indication that the media player is loaded by the user device, an indication the media player is playing the video data, an indication the media player is paused, an indication the media player is stopped, an indication the media player is displaying an advertisement, a percentage of the video data presented by the media player, or a length of time that the media player has presented the video data.

4. The system of claim 3, wherein the media player state description further comprises one or more of data specifying a user of the user device indicated a preference for the video data, data specifying the user device received an input to share the video data, or a referring web page identifier of a referring web page that directed the user device to the web page.

5. The system of claim 1, further comprising instructions for:
receiving the media player state information at periodic intervals.

6. The system of claim 1, further comprising instructions for:
receiving the media player state information responsive to the media player receiving an interaction.

7. The system of claim 1, further comprising instructions for:
receiving one or more criteria and retrieving a subset of the media player state information or the web analytics data in the analytics store based on the one or more criteria.

8. The system of claim 1, further comprising instructions for:
retrieving data from the analytics store and generating a report using the media player state information or the web analytics data.

9. The system of claim 1, wherein the media player determines the media player cookie matches the tracking cookie if a user identifier associated with the media player cookie matches a user identifier associated with the tracking cookie.

10. A computer-implemented method comprising:
transmitting media player state information to an analytics engine responsive to loading a media player, the media player state information describing an interaction with video data;
determining if a media player cookie associated with the media player matches a tracking cookie associated with a web page including the media player; and
responsive to the media player cookie matching the tracking cookie, transmitting web analytics data describing an interaction with the web page.

11. The computer-implemented method of claim 10, wherein transmitting media player state information comprises:
transmitting a video data identifier, a web page identifier associated with the web page, an address of a user device loading the web page and a media player state description.

12. The computer-implemented method of claim 11, wherein the media player state description comprises at least one of: an indication that the media player is loaded by the user device, an indication the media player is playing the video data, an indication the media player is paused, an indication the media player is stopped, an indication the media player is displaying an advertisement, a percentage of the video data presented by the media player or a length of time that the media player has presented the video data.

13. The computer-implemented method of claim 12, wherein the media player state description further comprises one or more of data specifying a user of the user device indicated a preference for the video data, data specifying the user device received an input to share the video data or a referring web page identifier of a referring web page that directed the user device to the web page.

14. The computer-implemented method of claim 11, wherein the media player state description includes tracking data identifying a website including the web page and a website from which the video data originates.

15. The computer-implemented method of claim 10, wherein determining if a media player cookie associated with the media player matches a tracking cookie associated with a web page including the media player comprises:
determining if the tracking cookie is associated with the web page including the media player; and
responsive to the tracking cookie being associated with the web page, determining if a user identifier associated with the tracking cookie matches a user identifier associated with the media player cookie.

16. An apparatus comprising a non-transitory computer readable medium encoding instructions thereon that in response to execution by a computing device cause the computing device to perform operations comprising:
transmitting media player state information to an analytics engine responsive to loading a media player, the media player state information describing an interaction with video data;
determining if a media player cookie associated with the media player matches a tracking cookie associated with a web page including the media player; and
transmitting web analytics data describing an interaction with the web page responsive to the media player cookie matching the tracking cookie.

17. The apparatus of claim 16, wherein the operations further comprise:
transmitting a video data identifier, a web page identifier associated with the web page, an address of a user device loading the web page and a media player state description.

18. The apparatus of claim 17, wherein the media player state description comprises at least one of: an indication that the media player is loaded by the user device, an indication the media player is playing the video data, an indication the media player is paused, an indication the media player is stopped, an indication the media player is displaying an advertisement, a percentage of the video data presented by the media player or a length of time that the media player has presented the video data.

19. The apparatus of claim 18, wherein the media player state description further comprises one or more of data specifying a user of the user device indicated a preference for the video data, data specifying the user device received an input to share the video data or a referring web page identifier of a referring web page that directed the user device to the web page.

20. The apparatus of claim 16, wherein the media player state description includes tracking data identifying a website including the web page and a website from which the video data originates.

21. The apparatus of claim 16, wherein determining if a media player cookie associated with the media player matches a tracking cookie associated with a web page including the media player comprises:
determining if the tracking cookie is associated with the web page including the media player; and
determining if a user identifier associated with the tracking cookie matches a user identifier associated with the media player cookie responsive to the tracking cookie being associated with the web page.

* * * * *